(12) United States Patent
Kabul et al.

(10) Patent No.: US 10,360,500 B2
(45) Date of Patent: Jul. 23, 2019

(54) TWO-PHASE DISTRIBUTED NEURAL NETWORK TRAINING SYSTEM

(71) Applicant: SAS Institute Inc., Cary, NC (US)

(72) Inventors: Mustafa Onur Kabul, Apex, NC (US); Lawrence E. Lewis, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/946,331

(22) Filed: Apr. 5, 2018

(65) Prior Publication Data

US 2018/0307986 A1 Oct. 25, 2018

Related U.S. Application Data

(60) Provisional application No. 62/487,977, filed on Apr. 20, 2017.

(51) Int. Cl.
*G06N 3/04* (2006.01)
*G06N 3/08* (2006.01)

(52) U.S. Cl.
CPC .............. *G06N 3/08* (2013.01); *G06N 3/04* (2013.01)

(58) Field of Classification Search
CPC ............ G06N 3/08; G06N 3/04; G06N 3/063; G06N 3/082; G06N 99/005
USPC .......................................................... 706/25
See application file for complete search history.

(56) References Cited

U.S. PATENT DOCUMENTS

| | | | |
|---|---|---|---|
| 9,390,370 B2 | 7/2016 | Kingsbury | |
| 9,413,779 B2 * | 8/2016 | Vasseur | H04L 43/0876 |
| 9,424,528 B2 * | 8/2016 | Kaushal | G05B 13/0265 |
| 9,524,471 B2 | 12/2016 | Narisetty et al. | |
| 9,563,854 B2 * | 2/2017 | Cruz Mota | G06N 3/08 |
| 9,836,765 B2 * | 12/2017 | Hariri | G06Q 30/0269 |
| 2003/0014400 A1 * | 1/2003 | Siegel | G09B 5/00 |
| 2003/0204368 A1 * | 10/2003 | Ertin | G06K 9/6262 |
| | | | 702/179 |

(Continued)

OTHER PUBLICATIONS

Bagnell et al.—Autonomous Helicopter Control using Reinforcement Learning Policy Search Methods—2001—http://citeseerx.ist.psu.edu/viewdoc/download?doi=10.1.1.465.8751&rep=rep1&type=pdf (Year: 2001).*

(Continued)

*Primary Examiner* — Scott A. Waldron
*Assistant Examiner* — Viker A Lamardo
(74) *Attorney, Agent, or Firm* — Bell & Manning, LLC

(57) ABSTRACT

A computing system provides distributed training of a neural network model. Explore phase options, exploit phase options, a subset of a training dataset, and a validation dataset are distributed to a plurality of computing devices. (a) Execution of the model by the computing devices is requested using the subset stored at each computing device. (b) A first result of the execution is received from a computing device. (c) Next configuration data for the neural network model is selected based on the first result and distributed to the computing device. (a) to (c) is repeated until an exploration phase is complete. (d) Execution of the neural network model is requested. (e) A second result is received. (f) Next configuration data is computed based on the second result and distributed to the computing device. (d) to (f) is repeated until an exploitation phase is complete. The next configuration data defines the model.

30 Claims, 26 Drawing Sheets

(56) References Cited

U.S. PATENT DOCUMENTS

| | | | | |
|---|---|---|---|---|
| 2003/0220860 | A1* | 11/2003 | Heytens | G06N 5/022 705/35 |
| 2008/0243735 | A1* | 10/2008 | Rish | G06N 5/003 706/17 |
| 2009/0112780 | A1* | 4/2009 | Chen | G06F 9/44505 706/19 |
| 2009/0313191 | A1* | 12/2009 | Yao | G06F 17/5045 706/13 |
| 2010/0138026 | A1* | 6/2010 | Kaushal | G05B 13/0265 700/104 |
| 2010/0138452 | A1* | 6/2010 | Henkin | G06Q 30/02 707/803 |
| 2010/0250332 | A1* | 9/2010 | Ghosh | G06Q 30/02 705/14.41 |
| 2013/0254153 | A1* | 9/2013 | Marcheret | G06N 20/00 706/59 |
| 2014/0097979 | A1* | 4/2014 | Nohara | G01S 7/003 342/90 |
| 2015/0095271 | A1* | 4/2015 | Ioannidis | G06Q 30/02 706/12 |
| 2016/0057061 | A1* | 2/2016 | Avci | H04L 47/125 370/235 |
| 2016/0132787 | A1* | 5/2016 | Drevo | G06N 20/00 706/12 |
| 2016/0314402 | A1* | 10/2016 | Buccapatnam Tirumala | G06N 7/005 |
| 2017/0061481 | A1* | 3/2017 | Wee | G06Q 30/0254 |

OTHER PUBLICATIONS

Niv et al.—Evolution of Reinforcement Learning in Uncertain Environments A Simple Explanation for Complex Foraging Behaviors—2002—https://www.princeton.edu/~yael/Publications/NivEtAl2002.pdf (Year: 2002).*

Even-Dar et al.—Action Elimination and Stopping Conditions for the Multi-Armed Bandit and Reinforcement Learning Problems—2006—https://dl.acm.org/citation.cfm?id=1248586 (Year: 2006).*

Thomas Gabel—Multi-Agent Reinforcement Learning Approaches for Distributed Job-Shop Scheduling Problems—2009—https://pdfs.semanticscholar.org/be2d/69a1ad0a1051f1b81a7993892d569b6325ef.pdf?_ga=2.2664626.328268325.1533500629-1963855748.1530715815 (Year: 2009).*

Hillel et al.—Distributed Exploration in Multi-Armed Bandits—2013—https://arxiv.org/pdf/1311.0800.pdf (Year: 2013).*

Mnih et al.—Playing Atari with Deep Reinforcement Learning—2013—https://arxiv.org/abs/1312.5602 (Year: 2013).*

Samaneh Rastegari—Intelligent network intrusion detection using an evolutionary computation approach—2015—http://ro.ecu.edu.au/cgi/viewcontent.cgi?article=2761&context=theses (Year: 2015).*

Nair et al.—Massively Parallel Methods for Deep Reinforcement Learning—2015—https://arxiv.org/abs/1507.04296 (Year: 2015).*

Yahya et al.—Collective Robot Reinforcement Learning with Distributed Asynchronous Guided Policy Search—2016—https://arxiv.org/pdf/1610.00673.pdf (Year: 2016).*

Kingma et al., Adam: A Method for Stochastic Optimization, ICLR 2015, May 7, 2015.

Zhang et al., Asynchronous Distributed ADMM for Consensus Optimization, Proceedings of the 31st International Conference on Machine Learning, Beijing, China, Jun. 2014.

Zhang et al., Deep learning with Elastic Averaging SGD, neural information processing systems, Dec. 2015.

Zhang et al., Deep learning with Elastic Averaging SGD, arXiv:1412.6651v8, Oct. 25, 2015.

Niu et al., Hogwild!: A Lock-Free Approach to Parallelizing Stochastic Gradient Descent, neural information processing systems, Dec. 2011.

Chaudhari et al., Entropy-SGD: Biasing Gradient Descent Into Wide Valleys, arXiv:1611.01838v5, Apr. 21, 2017.

Why MXNet?, Available no earlier than May 13, 2017.

Abadi et al., TensorFlow: Large-Scale Machine Learning on Heterogeneous Distributed Systems, Nov. 9, 2015.

Keskar et al., On Large-Batch Training for Deep Learning: Generalization Gap and Sharp Minima, arXiv:1609.04836v2, Feb. 9, 2017.

Dean et al., Large Scale Distributed Deep Networks, Neural Information Processing Systems, Dec. 2012.

Richtarik et al., Big Data Optimization: Randomized lock-free methods for minimizing partially separable convex functions, Jan. 11, 2013.

Sutskever et al., On the importance of initialization and momentum in deep learning, Proceedings of the 30th International Conference on Machine Learning, Atlanta, Georgia, Jun. 2013.

Hinton et al., Neural Networks for Machine Learning, Lecture 6a Overview of mini-batch gradient descent (2012).

Hogwild: A Lock-Free Approach to Parallelizing Stochastic Gradient Descent, Jan. 1, 2016.

* cited by examiner

TWO-PHASE DISTRIBUTED NEURAL NETWORK TRAINING SYSTEM

CROSS-REFERENCE TO RELATED APPLICATIONS

The present application claims the benefit of 35 U.S.C. § 119(e) to U.S. Provisional Patent Application No. 62/487,977 filed Apr. 20, 2017, the entire contents of which are hereby incorporated by reference.

SUMMARY

In an example embodiment, a computer-readable medium is provided having stored thereon computer-readable instructions that when executed by a computing device, cause the computing device to provide distributed training of a neural network model. Explore phase options are distributed to each computing device of a plurality of computing devices. A subset of a training dataset is distributed to each computing device of a plurality of computing devices. A validation dataset is distributed to each computing device of the plurality of computing devices. Initialization of a neural network model by the plurality of computing devices is requested. (a) Execution of the initialized neural network model by the plurality of computing devices is requested using the subset of the training dataset stored at each computing device of the plurality of computing devices. (b) A first result of the execution is received from a computing device of the plurality of computing devices. (c) Next configuration data for the neural network model is selected based on the received first result. (d) The selected next configuration data is distributed to the computing device. (a) to (d) is repeated until an exploration phase is complete based on the explore phase options.

Exploit phase options are distributed to each computing device of the plurality of computing devices. (e) Execution of the neural network model by the plurality of computing devices using the subset of the training dataset stored at each computing device of the plurality of computing devices is requested. (f) A second result of the execution is received from the computing device of the plurality of computing devices. (g) Next configuration data is computed for the neural network model based on the received second result. (h) The computed next configuration data is distributed to the computing device. (e) to (h) is repeated until an exploitation phase is complete based on the exploit phase options. At least a portion of the computed next configuration data is output to define a trained neural network model.

In another example embodiment, a system is provided. The system includes, but is not limited to, a processor and a computer-readable medium operably coupled to the processor. The computer-readable medium has instructions stored thereon that, when executed by the processor, cause the system to distribute training of a neural network model.

In yet another example embodiment, a method of distributed training of a neural network model is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 21:
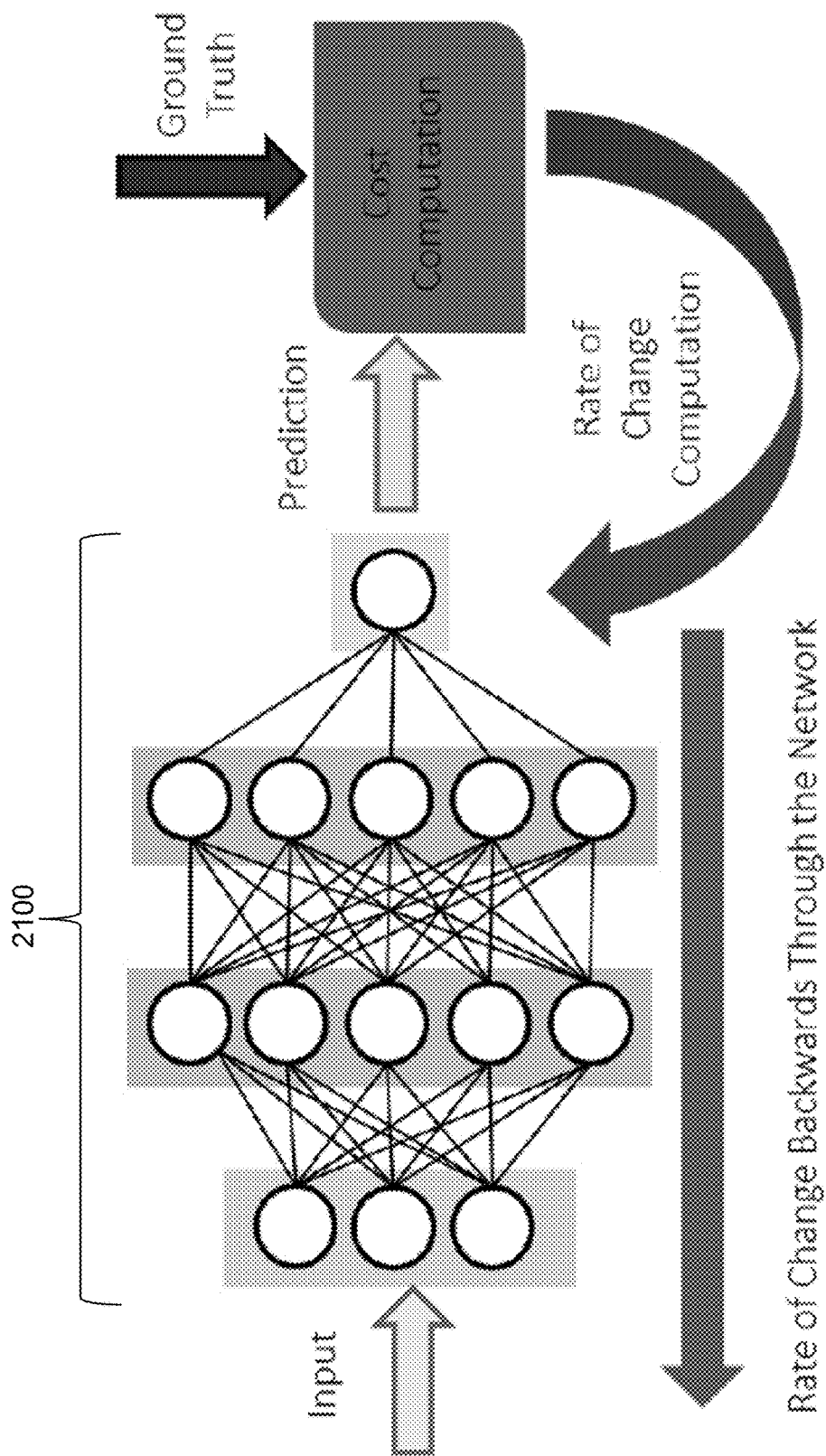
FIG. 21 illustrates an optimization problem improved by the neural network training system of FIG. 1.

Training a neural network is done by a data centric optimization algorithm. A given neural network defines a function mapping from an input value to an output value. This mapping is done by matrix multiplications that involve the input (data) and the hyperparameters of the neural network. The hyperparameters correspond to the links of a neural network graph 2100 as shown referring to FIG. 21, which graphically illustrates solving an optimization problem as part of training a neural network. A goal of the optimization is to minimize a task specific cost function, which is defined using a predicted value of the neural network and a desired or predefined output (label, ground truth) provided in the data. The cost computation evaluates a goodness of fit of the neural network to the data. By minimizing the cost, the accuracy of the neural network predictions is improved.

To make neural network predictions more accurate, the values of its parameters are updated iteratively. Before doing this, how much each value changes is computed. An efficient way of computing these values is done using a back-propagation method that computes a rate of change by going through each computation unit or node in the neural network, by calculating partial derivatives of the network error with respect to each parameter linking pairs of nodes, and by applying the chain rule to do the same thing to the next computation unit. With one backward pass, the gradient (rate of change) values for each of the parameters of the neural network is computed. These gradient values are input to the optimization method to make the actual parameter update. There are a large variety of different optimization methods, almost all of which depend on knowledge of the values of the gradient for each parameter in the neural network.

The most common method used to solve the optimization problem is the stochastic gradient descent method (SGD). The SGD method can be implemented in a distributed fashion and/or a multi-threaded fashion. Both synchronous and asynchronous methods of distributing the processing required by SGD have been described by others. For example, Chaudhari, P., et al., *Entropy-SGD: Biasing Gradient Descent Into Wide Valleys*, ICLR (2017) describes an existing synchronous method, and Zhang, S., et al, *Deep learning with elastic averaging SGD*, NIPS'15 Proceedings of the 28th International Conference on Neural Information Processing Systems, Vol. 1, 685-693 (2015) describes an existing asynchronous method.

Figure 22:
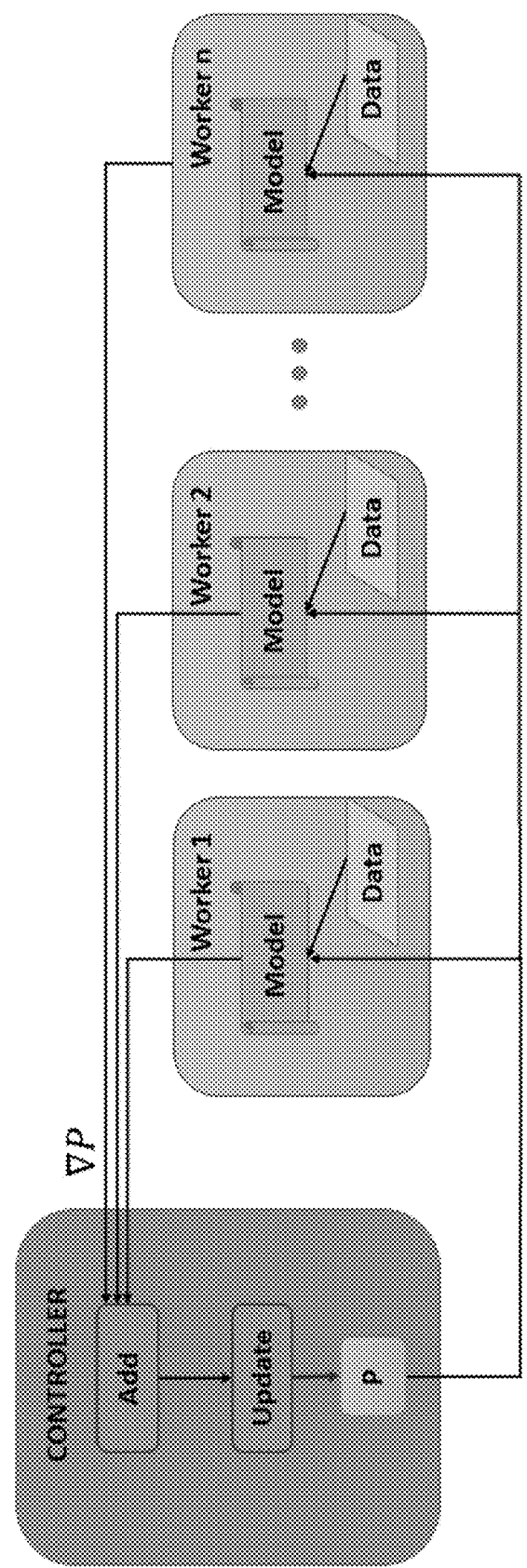
FIG. 22 illustrates a synchronous data parallel method of implementation of the neural network training system of FIG. 1.

For illustration, FIG. 22 generally shows a synchronous data parallel method where data is distributed randomly to a grid of computers (worker 1, worker 2, . . . , worker n). The workers compute gradients on the data that is local to the respective worker and send the computed gradients to a controller. The controller performs a collective reduce operation to aggregate and update the gradient vector that is sent to each worker. Each worker has the same copy of the gradient vector for a next iteration.

Figure 23:
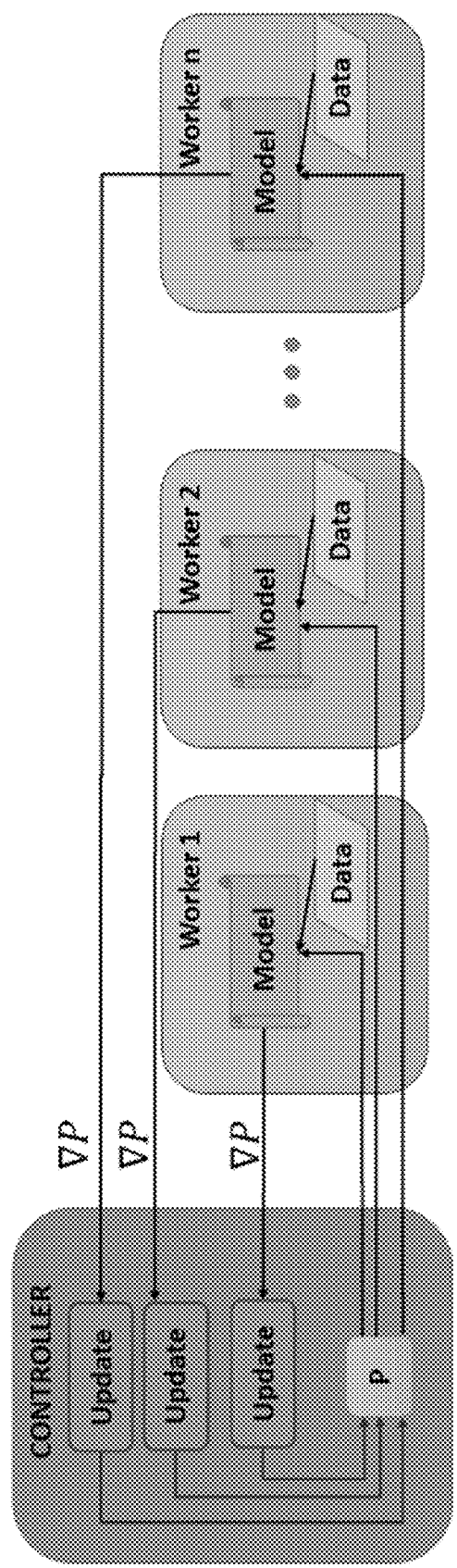
FIG. 23 illustrates an asynchronous data parallel method of implementation of the neural network training system of FIG. 1.

For illustration, FIG. 23 generally shows an asynchronous data parallel method where data is distributed randomly to a grid of computers (worker 1, worker 2, . . . , worker n). The workers compute gradients on the data that is local to the respective worker independently and send the computed gradients to the controller. The controller performs separate updates of the gradient vector that is sent to each respective worker. Because each worker communicates with the controller independently, only the controller has the most updated copy of the parameters. Since the communications are done asynchronously, this method is faster than the synchronous method in terms of per iteration time. However, due to noisier gradients, convergence performance may degrade.

Usually, both synchronous and asynchronous methods improve the computation time by orders of magnitude when compared to running on a single machine. However, there are shortcomings to use of these methods. First, both synchronous and asynchronous methods require a communication (sending information across the grid) of a large gradient vector after back-propagation is done on a subset (mini-batch) of observations due to the distribution of the data across the workers. Requiring a communication after each mini-batch update makes the algorithms highly communication intensive. When there are hundreds of millions of parameters, sending the gradient values across the communication network can incur a significant amount of computation cost, which may slow down training a significant amount.

Second, existing synchronous and asynchronous methods result in a generalization gap. Worker nodes compute the gradient on their local observations, and then enter into a collective aggregation operation, which computes a final gradient vector. The effective number of observations used to calculate the gradients is the total number of the observations across the grid of worker nodes. For example, there may be 100 worker nodes each with 16 threads. Using one observation per thread results in a mini-batch set size that includes 1,600 observations. Recent findings show that large mini-batch sizes do not generalize well, meaning the trained neural network may perform well on training data, but may not perform well on data it has never seen before. For reference see, N. S. Keskar, et al., *On Large-Batch Training for Deep Learning: Generalization Gap and Sharp Minima*, ICLR (2017).

Figure 1:
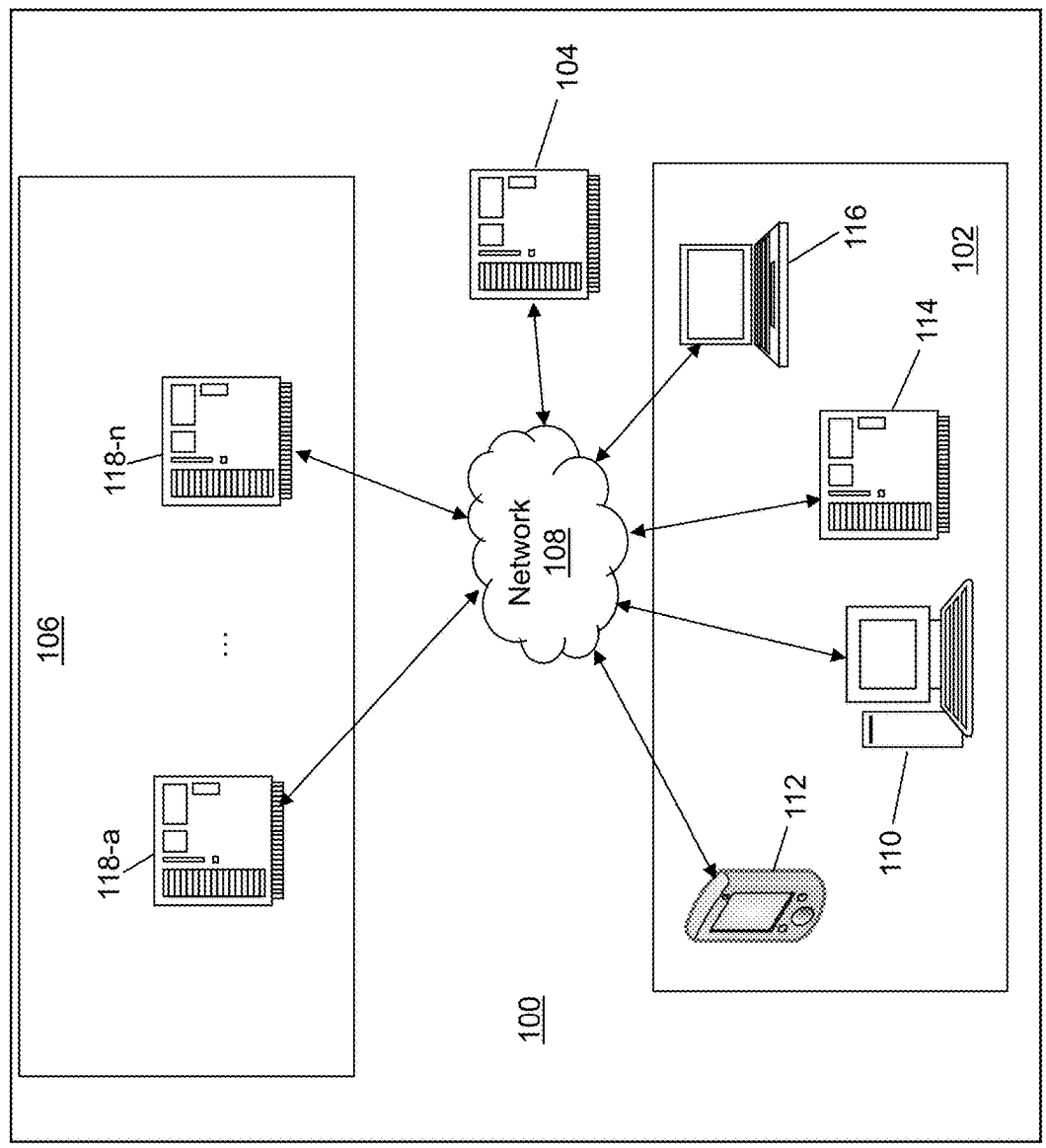
FIG. 1 depicts a block diagram of a neural network training system in accordance with an illustrative embodiment.

Referring to FIG. 1, a block diagram of a neural network training system 100 is shown in accordance with an illustrative embodiment. In an illustrative embodiment, neural network training system 100 may include a user system 102, a controller device 104, a worker system 106, and a network 108. Each of user system 102, controller device 104, and worker system 106 may be composed of one or more discrete computing devices in communication through network 108. User system 102 and controller device 104 may be integrated into a single computing device.

Network 108 may include one or more networks of the same or different types. Network 108 can be any type of wired and/or wireless public or private network including a cellular network, a local area network, a wide area network such as the Internet or the World Wide Web, etc. Network 108 further may comprise sub-networks and consist of any number of communication devices.

The one or more computing devices of user system 102 may include computing devices of any form factor such as a desktop 110, a smart phone 112, a server computer 114, a laptop 116, a personal digital assistant, an integrated messaging device, a tablet computer, etc. User system 102 can include any number and any combination of form factors of computing devices that may be organized into subnets. In general, a "server" computer may include faster processors, additional processors, more disk memory, and/or more random access memory (RAM) than another computer form factor and support multi-threading as understood by a person of skill in the art. The computing devices of user system 102 may send and receive signals through network 108 to/from another of the one or more computing devices of user system 102 and/or to/from controller device 104. The one or more computing devices of user system 102 may communicate using various transmission media that may be wired and/or wireless as understood by those skilled in the art. The one or more computing devices of user system 102 may be geographically dispersed from each other and/or co-located.

Figure 2:
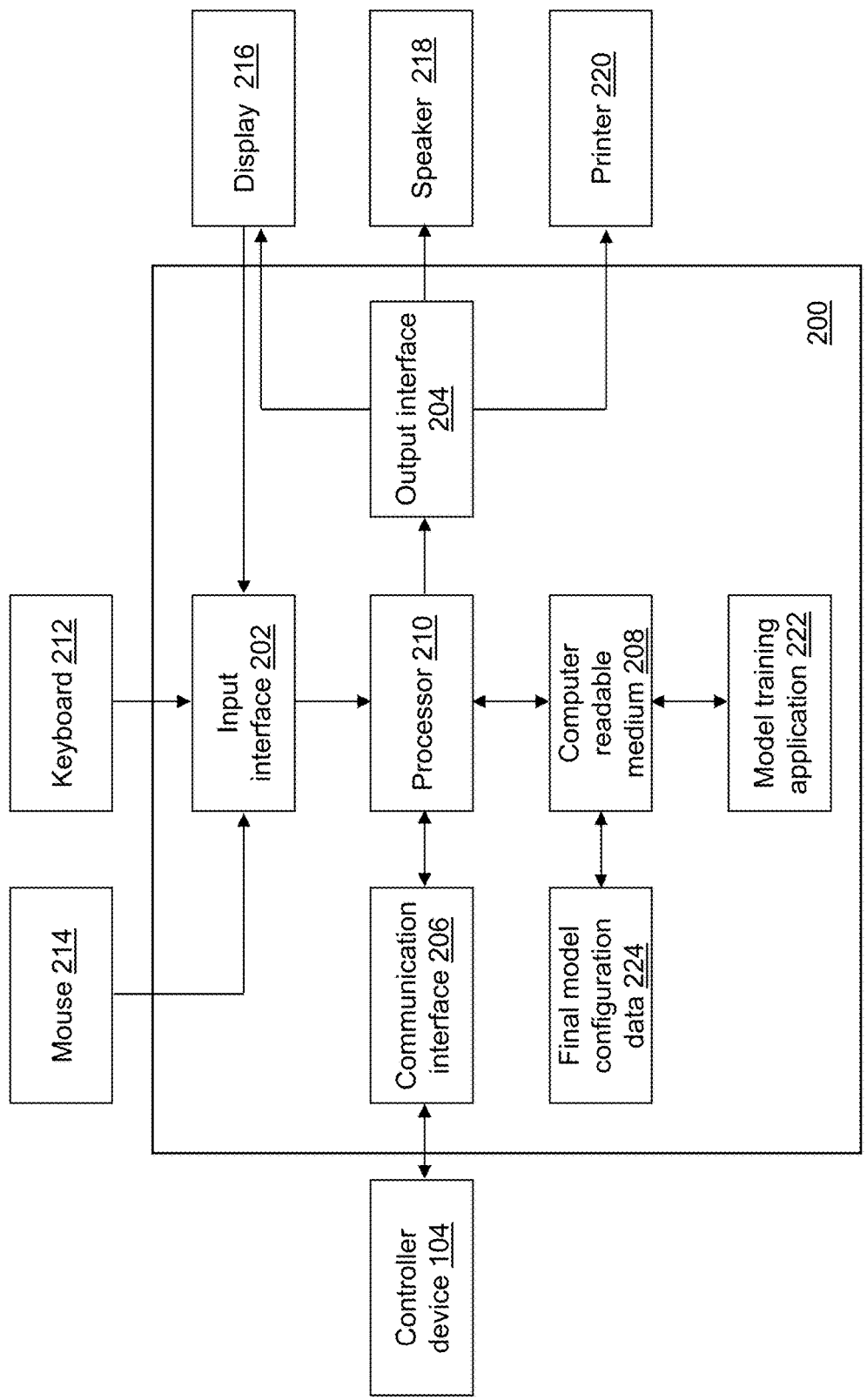
FIG. 2 depicts a block diagram of a user device of the neural network training system of FIG. 1 in accordance with an illustrative embodiment.

For illustration, referring to FIG. 2, a block diagram of a user device 200 is shown in accordance with an example embodiment. User device 200 is an example computing device of user system 102. For example, each of desktop 110, smart phone 112, server computer 114, and laptop 116 may be an instance of user device 200. User device 200 may include an input interface 202, an output interface 204, a communication interface 206, a computer-readable medium 208, a processor 210, a model training application 222, and final model configuration data 224. Each computing device of user system 102 may be executing model training application 222 of the same or different type.

Referring again to FIG. 1, controller device 104 can include any form factor of computing device. For illustration, FIG. 1 represents controller device 104 as a server computer. Controller device 104 may send and receive signals through network 108 to/from user system 102 and/or to/from worker system 106. Controller device 104 may communicate using various transmission media that may be wired and/or wireless as understood by those skilled in the art. Controller device 104 may be implemented on a plurality of computing devices of the same or different type. Neural network training system 100 further may include a plurality of manager devices.

Figure 3:
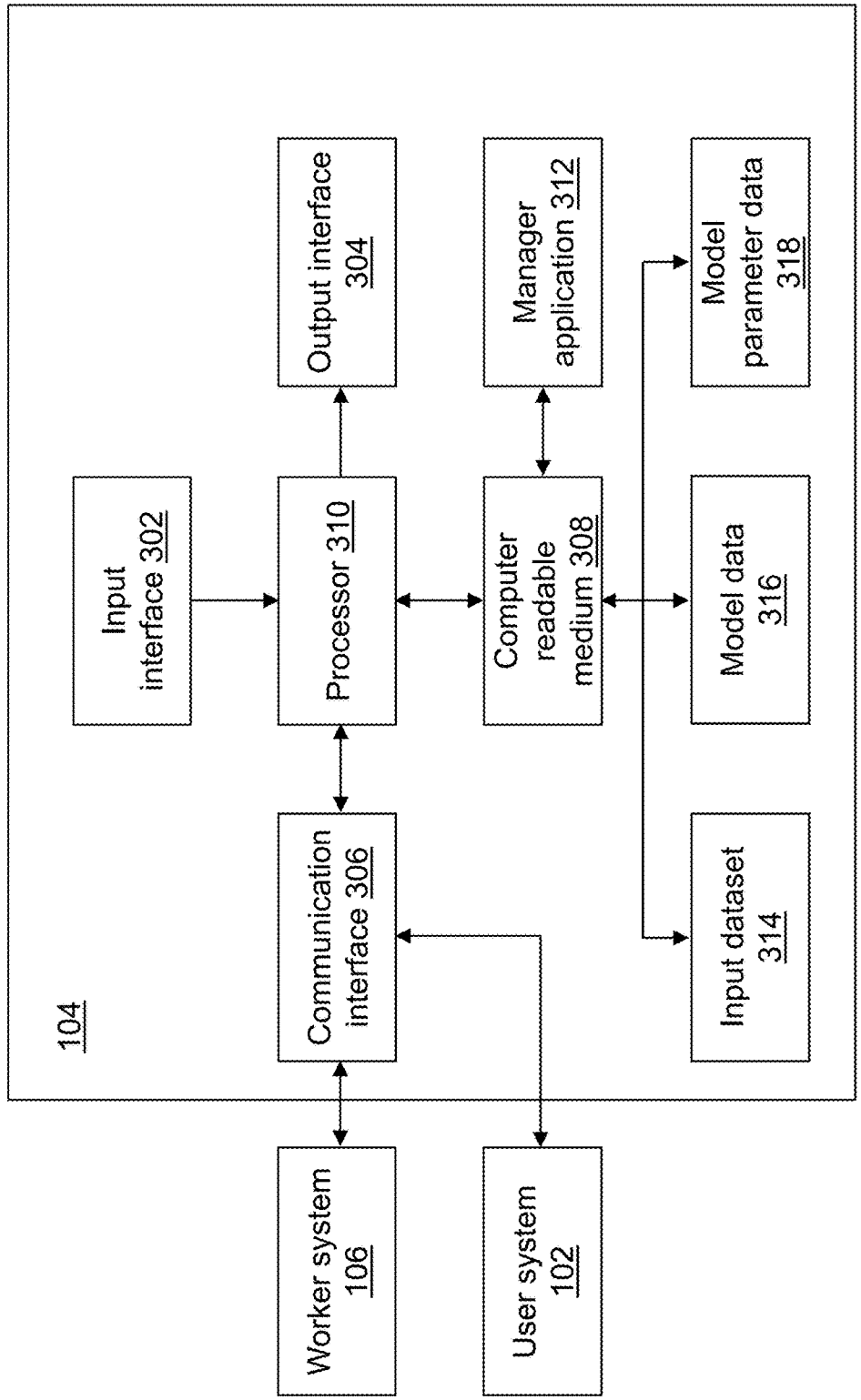
FIG. 3 depicts a block diagram of a manager device of the neural network training system of FIG. 1 in accordance with an illustrative embodiment.

For illustration, referring to FIG. 3, a block diagram of controller device 104 is shown in accordance with an illustrative embodiment. Controller device 104 may include a second input interface 302, a second output interface 304, a second communication interface 306, a second computer-readable medium 308, a second processor 310, a manager application 312, an input dataset 314, model data 316, and model parameter data 318. Controller device 104 may execute manager application 312 that creates model parameter data 318 based on input dataset 314 by controlling execution of training and scoring of a neural network model by the computing devices of worker system 106.

Referring again to FIG. 1, the one or more computing devices of worker system 106 may include computers of any form factor such as a desktop, a server, a laptop, etc. For example, in the illustrative embodiment, worker system 106 includes a first server computer 118-$a$, . . . , and an nth server computer 118-$n$. Each server computer may support use of a plurality of threads. The computing devices of worker system 106 may send and receive signals through network 108 to/from controller device 104 and/or to/from another computing device of worker system 106. The one or more computing devices of worker system 106 may be geographically dispersed from each other and/or co-located. The one or more computing devices of worker system 106 may communicate using various transmission media that may be wired and/or wireless as understood by those skilled in the art.

Figure 4:
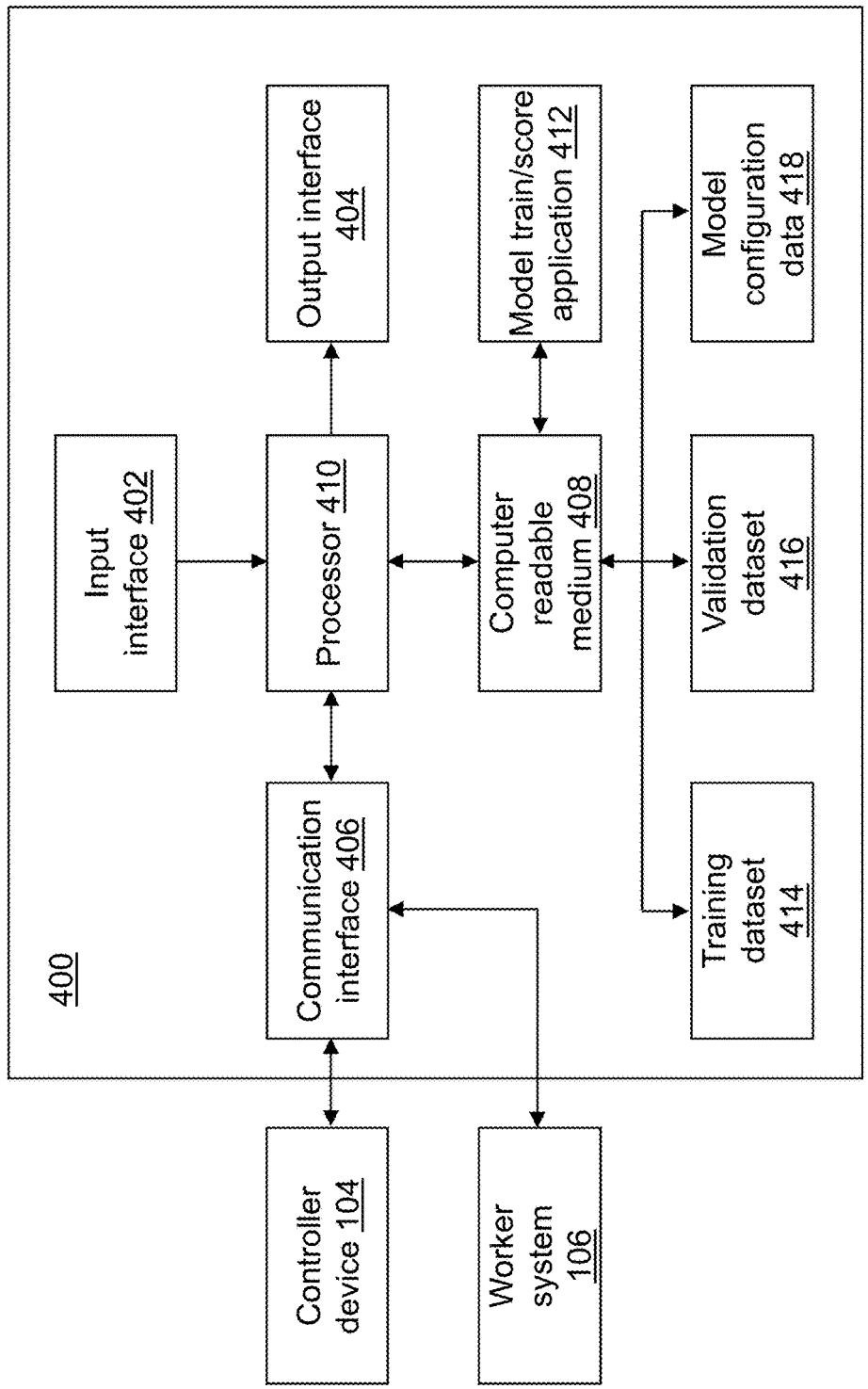
FIG. 4 depicts a block diagram of a worker device of the neural network training system of FIG. 1 in accordance with an illustrative embodiment.

For illustration, referring to FIG. 4, a block diagram of a worker device 400 is shown in accordance with an example embodiment. Worker device 400 is an example computing device of worker system 106. For example, each of first server computer 118-$a$, . . . , and nth server computer 118-$n$ may be an instance of worker device 400. Worker device 400 may include a third input interface 402, a third output interface 404, a third communication interface 406, a third computer-readable medium 408, a third processor 410, a model train/score application 412, a training dataset 414, a validation dataset 416, and model configuration data 418.

Referring again to FIG. 2, each user device 200 of user system 102 may include the same or different components and combinations of components. Fewer, different, and additional components may be incorporated into user device 200.

Input interface 202 provides an interface for receiving information for entry into user device 200 as understood by those skilled in the art. Input interface 202 may interface with various input technologies including, but not limited to, a keyboard 212, a mouse 214, a display 216, a track ball, a keypad, one or more buttons, etc. to allow the user to enter information into user device 200 or to make selections presented in a user interface displayed on display 216. The same interface may support both input interface 202 and output interface 204. For example, display 216 includes a touch screen that allows input from a user and that presents output to the user. User device 200 may have one or more input interfaces that use the same or a different input interface technology. The input interface technology further may be accessible by user device 200 through communication interface 206.

Output interface 204 provides an interface for outputting information for review by a user of user device 200. For example, output interface 204 may interface with various output technologies including, but not limited to, display 216, a speaker 218, a printer 220, etc. User device 200 may have one or more output interfaces that use the same or a different interface technology. The output interface technology further may be accessible by user device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. User device 200 may have one or more communication interfaces that use the same or a different communication interface technology. For example, user device 200 may support communication using an Ethernet port, a Bluetooth antenna, a telephone jack, a USB port, etc. Data and messages may be transferred between user device 200 and controller device 104 using communication interface 206.

Computer-readable medium 208 is a non-transitory electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. User device 200 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. User device 200 also may have one or more drives that support the loading of a memory media such as a CD or DVD, an external hard drive, etc. One or more external hard drives further may be connected to user device 200 using communication interface 106 and/or output interface 104.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. User device 200 may include a plurality of processors that use the same or a different processing technology.

Model training application 222 performs operations associated with training a neural network model. The operations may be implemented using hardware, firmware, software, or any combination of these methods. Referring to the example embodiment of FIG. 2, model training application 222 is implemented in software (comprised of computer-readable and/or computer-executable instructions) stored in computer-readable medium 208 and accessible by processor 210 for execution of the instructions that embody the operations of model training application 222. Model training application 222 may be written using one or more programming languages, assembly languages, scripting languages, etc.

Model training application 222 may be implemented as a Web application. For example, model training application 222 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an XML file, or any other type of file supported by HTTP.

Model training application 222 may be integrated with other analytic tools. As an example, model training application 222 may be part of an integrated data analytics software application and/or software architecture such as that offered by SAS Institute Inc. of Cary, N.C., USA. For example, model training application 222 may be part of SAS® Enterprise Miner™ developed and provided by SAS Institute Inc. of Cary, N.C., USA that may be used to create highly accurate predictive and descriptive models based on analysis of vast amounts of data from across an enterprise.

Merely for further illustration, model training application 222 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS® Viya™, SAS In-Memory Statistics for Hadoop®, SAS® Forecast Server, all of which are developed and provided by SAS Institute Inc. of Cary, N.C., USA. Data mining is applicable in a wide variety of industries.

Referring to FIG. 3, fewer, different, or additional components may be incorporated into controller device 104. Second input interface 302 provides the same or similar functionality as that described with reference to input interface 202 of user device 200 though referring to controller device 104. Second output interface 304 provides the same or similar functionality as that described with reference to output interface 204 of user device 200 though referring to controller device 104. Second communication interface 306 provides the same or similar functionality as that described with reference to communication interface 206 of user device 200 though referring to controller device 104. Data and messages may be transferred between controller device 104 and user device 200 and/or worker device 400 using second communication interface 306. Second computer-readable medium 308 provides the same or similar functionality as that described with reference to computer-readable medium 208 of user device 200 though referring to controller device 104. Second processor 310 provides the same or similar functionality as that described with reference to processor 210 of user device 200 though referring to controller device 104.

Manager application 312 performs operations associated with training a neural network model based on inputs provided from user device 200 using the computing devices of worker system 106. The operations may be implemented using hardware, firmware, software, or any combination of these methods. Referring to the example embodiment of FIG. 3, manager application 312 is implemented in software (comprised of computer-readable and/or computer-executable instructions) stored in second computer-readable medium 308 and accessible by second processor 310 for execution of the instructions that embody the operations of manager application 312. Manager application 312 may be written using one or more programming languages, assembly languages, scripting languages, etc. Manager application 312 may be implemented as a Web application.

Manager application 312 may be integrated with other analytic tools. As an example, manager application 312 may be part of an integrated data analytics software application and/or software architecture such as that offered by SAS Institute Inc. of Cary, N.C., USA. For example, manager application 312 may be part of SAS® Enterprise Miner™ developed and provided by SAS Institute Inc. of Cary, N.C., USA. Merely for further illustration, manager application 312 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS® Viya™, SAS In-Memory Statistics for Hadoop®, SAS® Forecast Server, all of which are developed and provided by SAS Institute Inc. of Cary, N.C., USA.

Referring to FIG. 4, fewer, different, and additional components may be incorporated into worker device 400. Each worker device 400 of worker system 106 may include the same or different components or combination of components.

Third input interface 402 provides the same or similar functionality as that described with reference to input interface 202 of user device 200 though referring to worker device 400. Third output interface 404 provides the same or similar functionality as that described with reference to output interface 204 of user device 200 though referring to worker device 400. Third communication interface 406 provides the same or similar functionality as that described with reference to communication interface 206 of user device 200 though referring to worker device 400. Data and messages may be transferred between worker device 400 and another computing device of worker system 106 and/or controller device 104 using third communication interface 406. Third computer-readable medium 408 provides the same or similar functionality as that described with reference to computer-readable medium 208 of user device 200 though referring to worker device 400. Third processor 410 provides the same or similar functionality as that described with reference to processor 210 of user device 200 though referring to worker device 400.

Model train/score application 412 may be integrated with other analytic tools. As an example, model train/score application 412 may be part of an integrated data analytics software application and/or software architecture such as that offered by SAS Institute Inc. of Cary, N.C., USA. For example, model train/score application 412 may be part of SAS® Enterprise Miner™ developed and provided by SAS Institute Inc. of Cary, N.C., USA. Merely for further illustration, model train/score application 412 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS® Viya™, SAS In-Memory Statistics for Hadoop®, SAS® Forecast Server, all of which are developed and provided by SAS Institute Inc. of Cary, N.C., USA.

Model training application 222, manager application 312, and model train/score application 412 may be the same or different applications that are integrated in various manners to train a neural network model using input dataset 314 distributed across a plurality of computing devices that may include controller device 104 and/or worker system 106.

Input dataset 314 may include, for example, a plurality of rows and a plurality of columns. The plurality of rows may be referred to as observation vectors or records (observations), and the columns may be referred to as variables. Input dataset 314 may be transposed. Input dataset 314 may include labeled and/or unlabeled data. The plurality of variables may define multiple dimensions for each observation vector. An observation vector $x_i$ may include a value for each of the plurality of variables associated with the observation i. Each variable of the plurality of variables may describe a characteristic of a physical object. For example, if input dataset 314 includes data related to operation of a vehicle, the variables may include an oil pressure, a speed, a gear indicator, a gas tank level, a tire pressure for each tire, an engine temperature, a radiator level, etc. Input dataset 314 may include data captured as a function of time for one or more physical objects. As another example, input dataset 314 may include data related to images, where each row includes the pixels that define a single image. The images may be of any item for which image recognition or classification may be performed including, but not limited to, faces, objects, alphanumeric letters, terrain, plants, animals, etc.

The data stored in input dataset 314 may be generated by and/or captured from a variety of sources including one or more sensors of the same or different type, one or more computing devices, etc. The data stored in input dataset 314 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Input dataset 314 may be stored on computer-readable medium 208, on second computer-readable medium 308, and/or on third computer-readable medium 408, and/or on one or more computer-readable media accessible by manager application 312 using second communication interface 306 and/or second input interface 302. Data stored in input dataset 314 may be sensor measurements or signal values captured by a sensor such as a camera, may be generated or captured in response to occurrence of an event or a transaction, generated by a device such as in response to an interaction by a user with the device, etc. The data stored in input dataset 314 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in input dataset 314 may be captured at different time points periodically, intermittently, when an event occurs, etc. One or more columns of input dataset 314 may include a time and/or date value.

Input dataset 314 may include data captured under normal operating conditions of the physical object. Input dataset 314 may include data captured at a high data rate such as 200 or more observations per second for one or more physical objects. For example, data stored in input dataset 314 may be generated as part of the Internet of Things (IoT), where things (e.g., machines, devices, phones, sensors) can be connected to networks and the data from these things collected and processed within the things and/or external to the things before being stored in input dataset 314. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input dataset 314.

Input dataset 314 may be stored using various structures as known to those skilled in the art including one or more files of a file system, a relational database, one or more tables of a system of tables, a structured query language database, etc. Manager device 104 may coordinate access to input dataset 314 that is distributed across worker system 106. For example, input dataset 314 may be stored in a cube distributed across worker system 106 that forms a grid of computers as understood by a person of skill in the art. As another example, input dataset 314 may be stored in a multi-node Hadoop® cluster. For instance, Apache™ Hadoop® is an open-source software framework for distributed computing supported by the Apache Software Foundation. As another example, input dataset 314 may be stored in worker system 106 that forms a cloud of computers and accessed using cloud computing technologies, as understood by a person of skill in the art. The SAS® LASR™ Analytic Server may be used as an analytic platform to enable multiple users to concurrently access data stored in input dataset 314. The SAS® Viya™ open, cloud-ready, in-memory architecture also may be used as an analytic platform to enable multiple users to concurrently access data stored in input dataset 314. SAS Cloud Analytic Services (CAS) may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 5:
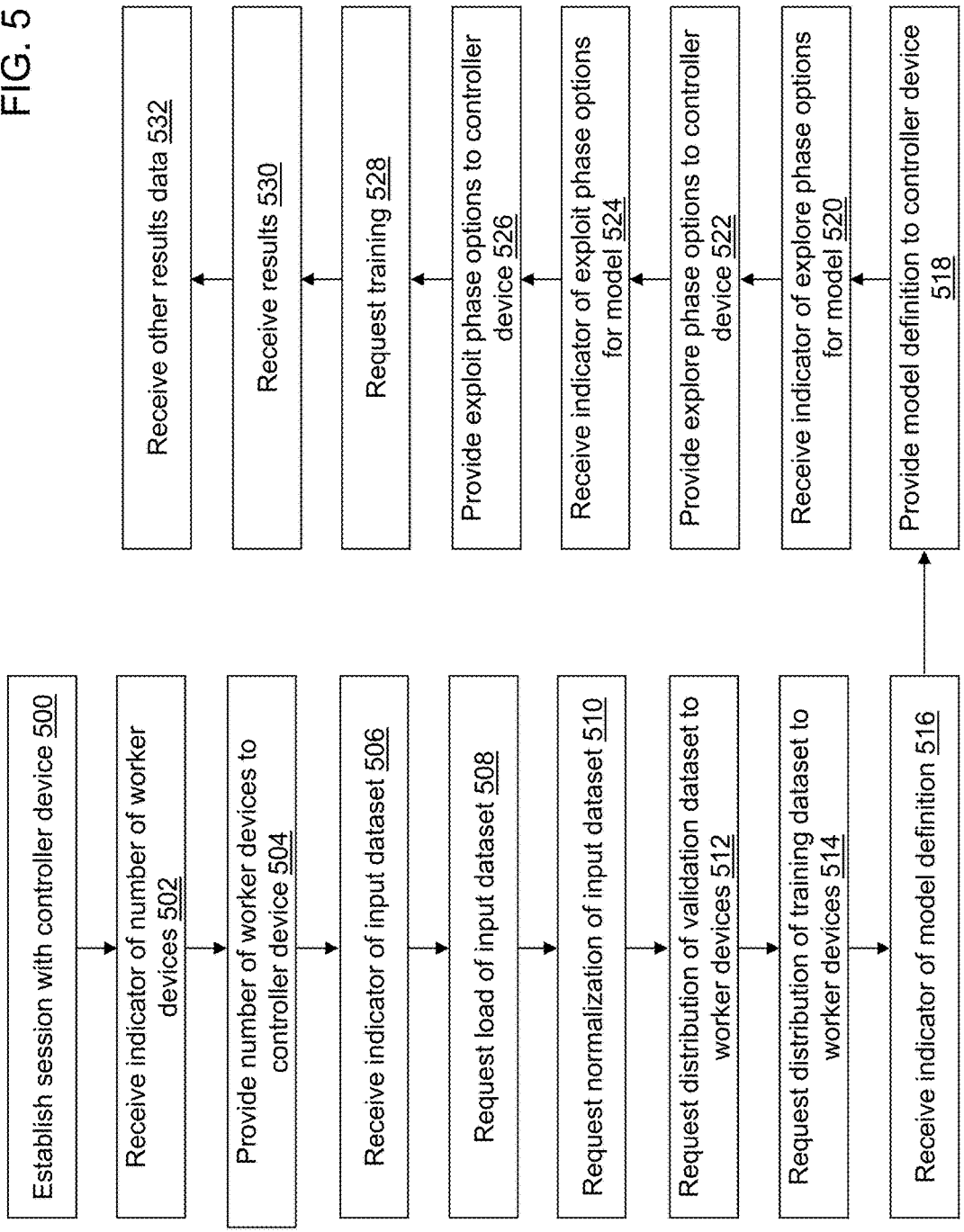
FIG. 5 depicts a flow diagram illustrating examples of operations performed by the user device of FIG. 2 in accordance with an illustrative embodiment.

Referring to FIG. 5, example operations associated with model training application 222 are described. Additional, fewer, or different operations may be performed depending on the embodiment. The order of presentation of the operations of FIG. 5 is not intended to be limiting. A user can interact with one or more user interface windows presented to the user in a display under control of model training application 222 independently or through a browser application in an order selectable by the user. Although some of the operational flows are presented in sequence, the various operations may be performed in various repetitions, concurrently, and/or in other orders than those that are illustrated. For example, a user may execute model training application 222, which causes presentation of a first user interface window, which may include a plurality of menus and selectors such as drop down menus, buttons, text boxes, hyperlinks, etc. associated with model training application 222 as understood by a person of skill in the art. As further understood by a person of skill in the art, various operations may be performed in parallel, for example, using a plurality of threads or a plurality of computing devices such as a grid or a cloud of computing devices.

In an operation 500, a session is established with controller device 104. A "session" includes user device 200, controller device 104 that is a controller node, and a plurality of worker devices of worker system 106. User device 200 accepts commands from a user and relays instructions to controller device 104. Controller device 104 establishes a communication network with the worker devices of worker system 106, sending instructions to the worker devices of worker system 106, collecting and aggregating the results of computations from the worker devices of worker system 106, and communicating final results to user device 200. Controller device 104 may utilize itself as a worker device. The worker devices of worker system 106 receive instructions from controller device 104, store and process data, and send the results of computations back to controller device 104. Worker devices of worker system 106 may also communicate to each other directly to accomplish tasks.

In an operation 502, a first indicator may be received that indicates a value of W the number of computing devices or nodes of worker system 106 that may include controller device 104 (for example, the same or another indicator may indicate whether or not to include controller device 104 or it may or may not be included by default). The first indicator may further indicate whether controller device 104 is configured in a single-machine mode or a distributed mode. In an alternative embodiment, the first indicator may not be received. For example, a default value may be stored, for example, in computer-readable medium 208 and used automatically. In another alternative embodiment, W may not be selectable. Instead, a fixed, predefined value may be used. The value further may be automatically determined based on a number of computing devices connected to controller device 104.

Single-machine mode is a computing model in which multiple processors or multiple cores are controlled by a single operating system and can access shared resources, such as disks and memory. Single-machine mode refers to an application running multiple concurrent threads on a multi-core machine to take advantage of parallel execution on multiple processing units. More simply, single-machine mode means multithreading on the computing device. The number of CPUs (cores) on the computing device may be used to determine the number of concurrent threads. For example, one thread per core may be used though a number of threads on any computing device may be changed under control of the user. Controller device 104 may be a grid host specified for a distributed mode and may be identified using a domain name system (DNS) or IP address of controller device 104 as a separate device from user device 200.

In an operation 504, the value of W the number of computing devices or nodes of worker system 106 may be provided to controller device 104. For example, the value of W may be sent in a message or other instruction to controller device 104 or may be provided in a known memory location to controller device 104. In an alternative embodiment, user device 200 and controller device 104 may be integrated in the same computing device so that when the value of W are received by user device 200, it is also received by controller device 104.

In an operation 506, a second indicator may be received that indicates input dataset 314. For example, the second indicator indicates a location and a name of input dataset 314. As an example, the second indicator may be received by model training application 222 after selection from a user interface window or after entry by a user into a user interface window. In an alternative embodiment, input dataset 314 may not be selectable. For example, a most recently created dataset may be used automatically.

In an operation 508, a load of input dataset 314 may be requested. For example, user device 200 may request that input dataset 314 be loaded into a table that is ready for processing.

In an operation 510, when normalization of input dataset 314 is needed, a normalization of input dataset 314 by or coordinated by controller device 104 may be requested. For example, variable values for the observations stored in input dataset 314 may be scaled and normalized, variable strings may be reformatted, etc.

In an operation 512, a distribution of validation dataset 416 to each worker device 400 of worker system 106 by or coordinated by controller device 104 is requested. For example, validation dataset 416 may be randomly (e.g., uniform distribution) selected as a subset of input dataset 314 and distributed to each worker device 400 of worker system 106 so that validation dataset 416 is stored in computer-readable medium 408 when not already stored there. Each distributed validation dataset 416 may be the same and selected as a percentage of or a fraction of input dataset 314 with the remainder used to form each training dataset 414 distributed to worker devices of worker system 106.

In an operation 514, a distribution of training dataset 414 to each worker device 400 of worker system 106 by or coordinated by controller device 104 is requested. For example, training dataset 414 may be randomly (e.g., uniform distribution) selected as a subset of input dataset 314 and distributed to each worker device 400 of worker system 106 so that training dataset 414 is stored in computer-readable medium 408 when not already stored there. Each distributed training dataset 414 distributed to worker device 400 may be different from every other such that selections are made without replacement. Each distributed training dataset 414 further may be different from validation dataset 416 such that selections are made without replacement. A size of each training dataset 414 may be approximately equal as in include approximately the same number of observations. For example, an entirety of a remainder of input dataset 314 after extracting validation dataset 416 is approximately equally distributed among the W number of nodes of worker system 106.

In an operation 516, a third indicator of a neural network model definition may be received. The third indicator may be received by model training application 122 after selection from a user interface window or after entry by a user into a user interface window. A default value(s) may further be stored, for example, in computer-readable medium 208. In an alternative embodiment, the neural network model definition may not be selectable, and a single neural network model definition is implemented in model training application 122. The neural network model definition defines a neural network model architecture and other neural network model parameters to train a neural network model for minimum error as measured by a specified objective function. For illustration, a NNET procedure included in SAS® Visual Data Mining and Machine Learning 8.1 may be used to implement the neural network model definition in SAS® Viya™ developed and provided by SAS Institute Inc. of Cary, N.C., USA. The NNET procedure trains a multilayer perceptron neural network. Training a multilayer perceptron neural network relies on an unconstrained minimization of a nonlinear objective function. The goal of training is to determine a set of neural network weights that best predicts the targets in the training data while still doing a good job of predicting target values of unseen data (that is, generalizing well and not overfitting).

For example, the neural network architecture and other neural network hyperparameters may include a number of input layers parameter value, a number of output layers parameter value, a number of hidden layers parameter value, a number of convolutional layers parameter value, a number of pooling layers parameter value, a number of fully connected layers parameter value, a number of neurons per hidden layer parameter value, an activation function for each hidden layer parameter value, a random seed parameter value, a variable list, a target variable list, initial model weights, etc.

The initial model weights may be randomly generated. The variable list defines the variables defined for each observation vector of training dataset 414 and validation dataset 416 to include in training the neural network model. For example, a list of column numbers or variable column names may be provided for the variable list. The target variable list defines the variables defined for each observation vector of training dataset 414 and validation dataset 416 to use as target or truth values when training the neural network model. For example, a list of column numbers or variable column names may be provided for the target variable list.

In an operation 518, the neural network model definition may be provided to controller device 104. For example, the parameter value(s) may be sent in a message or other instruction to controller device 104 or may be provided in a known memory location to controller device 104. In an alternative embodiment, user device 200 and controller device 104 may be integrated in the same computing device so that when the parameter value(s) are received by user device 200, it is also received by controller device 104.

In an operation 520, a fourth indicator may be received that defines values for one or more explore phase optimization parameter value(s). For example, a first optimization method type, optimization method parameters such as an L1 norm regularization parameter value, an L2 norm regularization parameter value, an annealing rate parameter value, a learning rate parameter value, a step size parameter value, a maximum number of epochs parameter value, a convergence accuracy parameter value, a maximum number of iterations parameter value, a mini-batch size parameter value, a synchronization frequency parameter value, etc. may be included as the one or more explore phase optimization parameter value(s).

In an operation 522, the one or more explore phase optimization parameter value(s) may be provided to controller device 104. For example, the parameter value(s) may be sent in a message or other instruction to controller device 104 or may be provided in a known memory location to controller device 104. In an alternative embodiment, user device 200 and controller device 104 may be integrated in the same computing device so that when the parameter value(s) are received by user device 200, it is also received by controller device 104.

In an operation 524, a fifth indicator may be received that defines values for one or more exploit phase optimization parameter value(s). For example, a second optimization method type, optimization method parameters such as an L1 norm regularization parameter value, an L2 norm regularization parameter value, an annealing rate parameter value, a learning rate parameter value, a step size parameter value, a maximum number of epochs parameter value, a convergence accuracy parameter value, a maximum number of iterations parameter value, a mini-batch size parameter value, a synchronization frequency parameter value, etc. may be included as the one or more exploit phase optimization parameter value(s). At least one parameter value of the one or more exploit phase optimization parameter value(s) is different from the one or more explore phase optimization parameter value(s) such that different optimizations are performed during the explore phase as compared to the exploit phase.

In the exploration phase, the worker nodes of worker system 106 perform local optimization on their copy of training dataset 414. Since their portion of input dataset 314 is a random sample of the entire set of training observations, its distribution is close to the distribution of the entire set of training observations such that the local optimization is valid. Processing data locally for a longer time reduces the number of times the worker nodes of worker system 106 communicate with each other and/or controller device 104 across network 108. An explore synchronization frequency controls the frequency of communications. Only when the communication period expires is information shared decreasing the number of communications significantly and thereby reducing network traffic and communication time.

One disadvantage of this local optimization is that the worker nodes only learn from their copy of training dataset 414, which may result in generalization issues. To alleviate generalization issues, parameter merging described below consolidates the information gained from each worker node's local optimization. The exploitation phase quickly progresses in the region defined by the exploration phase. A much larger mini-batch size may be used during the exploitation phase because the exploration phase identified a flat area where the solution generalizes well, reducing the variability in the gradient computation and resulting in a faster convergence.

The benefits of the combination of an exploration phase with an exploitation phase can be summarized as follows:
both communication intensity and the generalization gap are addressed;
information is merged from local expert models;
a simpler update rule can be defined for the exploration phase, while in the exploitation phase, a more sophisticated method can be applied;
synchronous and asynchronous methods can be mixed (e.g., during the exploration phase, an asynchronous method can be used, while during the exploitation phase, a synchronous method can be used); and
internal state transmission between the two phases is seamlessly integrated.

For example, different SGD update rules may be applied in either the explore phase or the exploit phase. The one or more explore phase optimization parameter value(s) and/or the one or more exploit phase optimization parameter value(s) may include an update rule selected from "Momentum", "Adam", "RMSProp", etc. For example, Sutskever, I., et al., *On the importance of initialization and momentum in deep learning*, Proceedings of the 30th International Conference on Machine Learning, Vol. 28 (2013) describes an existing method for performing the "Momentum" update rule. For example, Kingman, D. P. and Ba, J. L., *ADAM: A METHOD FOR STOCHASTIC OPTIMIZATION*, ICLR (2015) describes an existing method for performing the "Adam" update rule. For example, slides from the course Neural Networks for Machine Learning, as taught by Geoffrey Hinton (University of Toronto) on Coursera in 2012 describe an existing method for performing the "RMSProp" update rule.

In an operation 526, the one or more exploit phase optimization parameter value(s) may be provided to controller device 104. For example, the parameter value(s) may be sent in a message or other instruction to controller device 104 or may be provided in a known memory location to controller device 104. In an alternative embodiment, user device 200 and controller device 104 may be integrated in the same computing device so that when the parameter value(s) are received by user device 200, it is also received by controller device 104.

In an operation 528, training of the defined neural network model is requested. When controller device 104 and user device 200 are integrated, training is initiated as described further referring to FIG. 6.

In an operation 530, training results are received. For example, model configuration data for the trained and validated neural network model may be stored in final model configuration data 224 on computer-readable medium 208. The model configuration data may be received from controller device 104. As another example, an indicator may be received that indicates that the training process is complete and final model configuration data 224 may already contain the model configuration data. For example, one or more output tables may be presented on display 216 when the training process is complete. As another option, display 216 may present a statement indicating that the training process is complete. The user can access the output tables in a predefined location. The model configuration data may include the neural network architecture and any other neural network parameters that define the trained and validated neural network model including the final neural network weights for each link of the neural network model that can be used to predict an output for a new observation.

In an operation 532, other results data may be received. For example, final validation results and/or scoring results may be received and may be stored on computer-readable medium 208. The final validation results and/or scoring results may be received from controller device 104. As another example, an indicator may be received that indicates that the training process is complete and the final validation results and/or scoring results may be stored in a pre-defined location including in final model configuration data 224. As another example, one or more output tables may be presented on display 216 when the training process is complete to show the final validation results and/or scoring results. For illustration, one or more graphs such as those presented in FIGS. 11-20 may be presented automatically to show the results.

Figure 6:
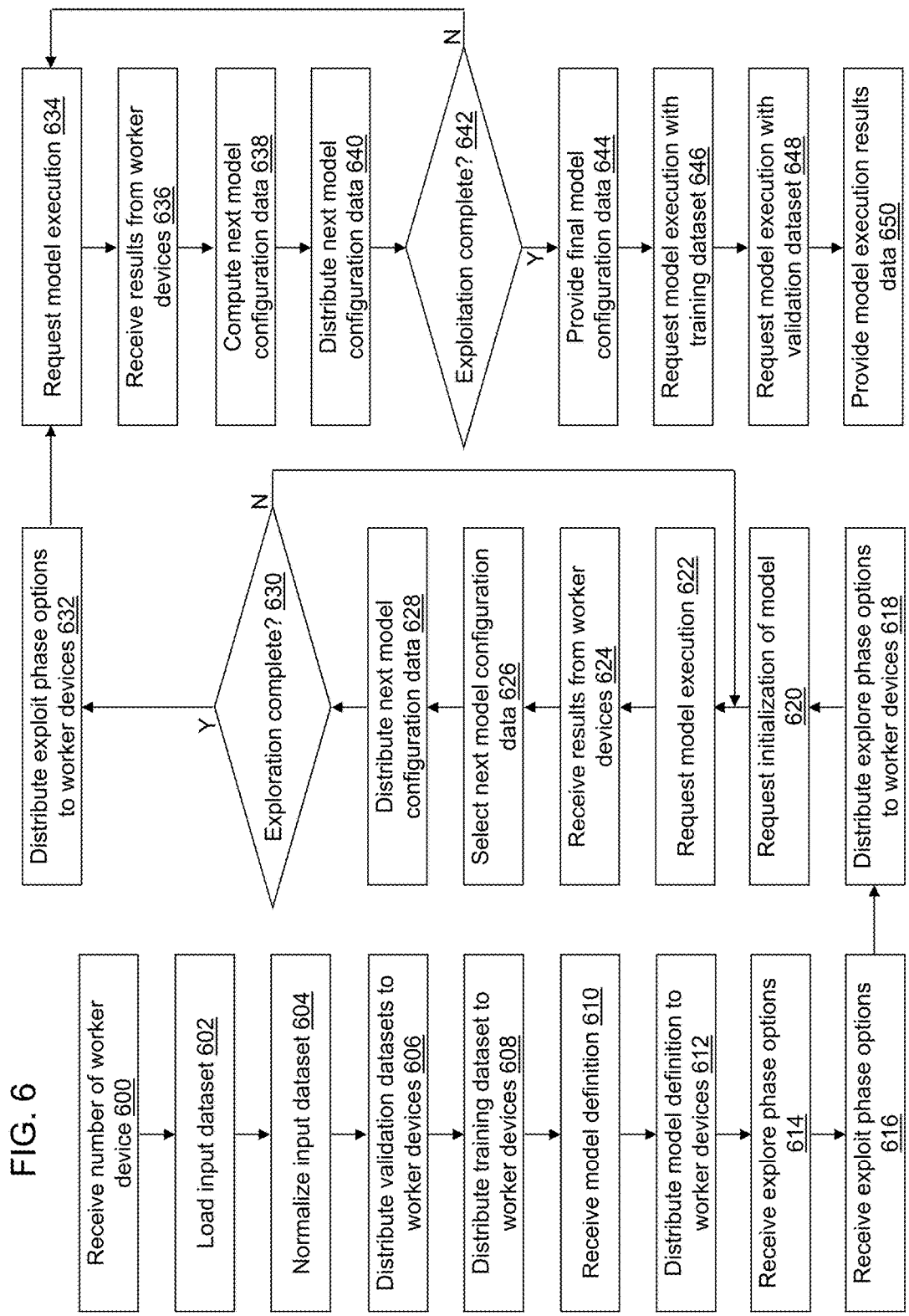
FIG. 6 depicts a flow diagram illustrating examples of operations performed by the manager device of FIG. 3 in accordance with an illustrative embodiment.

Referring to FIG. 6, example operations associated with manager application 312 are described. Additional, fewer, or different operations may be performed depending on the embodiment. The order of presentation of the operations of FIG. 6 is not intended to be limiting. Again, manager application 312 and model training application 222 may be integrated or be the same applications so that the operations of FIGS. 5 and 6 are merged.

In an operation 600, the value of W the number of computing devices or nodes of worker system 106 may be received from user device 200 or directly from the user of user device 200.

In an operation 602, input dataset 314 is loaded. For example, input dataset 314 may be loaded for processing as requested by user device 200 or directly from the user of user device 200.

In an operation 604, the loaded input dataset 314 may be normalized as requested by user device 200 or directly from the user of user device 200.

In an operation 606, validation dataset 416 may be selected from normalized input dataset 314 and may be distributed to each of the W number of worker devices 400 of worker system 106.

In an operation 608, training dataset 414 may be selected from normalized input dataset 314 to define training dataset 414 for each of the W number of worker devices 400 of worker system 106 and distributed to each of the W number of worker devices 400 of worker system 106.

In an operation 610, the neural network model definition may be received from user device 200 or directly from the user of user device 200 when integrated. The neural network model definition may be stored in model data 316.

In an operation 612, the neural network model definition may be distributed to each of the W number of worker devices 400 of worker system 106.

In an operation 614, the explore phase options may be received from user device 200 or directly from the user of user device 200.

In an operation 616, the exploit phase options may be received from user device 200 or directly from the user of user device 200.

In an operation 618, the explore phase options may be distributed to each of the W number of worker devices 400 of worker system 106.

In an operation 620, initialization of the neural network model to be trained may be requested of each of the W number of worker devices 400 of worker system 106 based on the neural network model definition and the explore phase options.

In an operation 622, execution of the initialized neural network model to be trained may be requested of each of the W number of worker devices 400 of worker system 106.

In an operation 624, results generated from the execution may be received or otherwise accessed. For example, the results may be received from the W number of worker devices 400 of worker system 106.

In an operation 626, next model configuration data to evaluate in a next iteration is selected based on the results received in operation 624. The next model configuration data may be stored in model parameter data 318.

In an operation 628, the next model configuration data, which includes the neural network weights, may be distributed to the W number of worker devices 400 of worker system 106.

In an operation 630, a determination is made concerning whether or not the exploration phase is complete. If the exploration phase is complete, processing continues in an operation 632 to perform the exploitation phase with the distributed next model configuration data as a starting point. If the exploration phase is not complete, processing continues in operation 622 to request a model execution with the next model configuration data.

For illustration, the determination that the exploration phase is complete may be based on a number of iterations of operation 630 in comparison to a maximum number of iterations specified as an explore phase option. As another example, the determination that the exploration phase is complete may be based on an accuracy value computed from or included in the results received in operation 624 in comparison to an explore phase accuracy specified as an explore phase option. As another example, the determination that the exploration phase is complete may be based on a lack of improvement in the accuracy value or the training loss for a predefined number of iterations specified as an explore phase option.

Operations 622 to 628 may be performed using different explore-exploit (EE) methods described referring to FIGS. 8A to 8E either synchronously or asynchronously. For example, the received results, selection of the next model configuration data, and distribution of the next model configuration data may vary based on the embodiment.

In operation 632, the exploit phase options may be distributed to each of the W number of worker devices 400 of worker system 106.

In an operation 634, execution of the neural network model to be trained may be requested of each of the W number of worker devices 400 of worker system 106 using the exploit phase options. During the exploit phase, the neural network model is trained collectively using training dataset 414 rather than locally as done during the explore phase.

In an operation 636, results generated from the execution may be received or otherwise accessed. For example, the results may be received from the W number of worker devices 400 of worker system 106.

In an operation 638, next model configuration data to evaluate in a next iteration is computed based on the results received in operation 636 and the exploit phase options that include an optimization method and input parameters associated with the optimization method. For example, the exploit phase options may indicate whether the operations 634 to 640 are performed synchronously or asynchronously. For illustration, a main difference between the explore phase and the exploit phase is how the information is used during optimization. During the explore phase, only local information is used for optimization and, at synchronization, the local information is combined to select a new model (set of parameters/weights for the neural network). During the exploit phase, global and local information is used for optimization so there are more frequent communications. The next model configuration data may be stored in model parameter data 318.

In an operation 640, the next model configuration data may be distributed to the W number of worker devices 400 of worker system 106.

In an operation 642, a determination is made concerning whether or not the exploitation phase is complete. If the exploitation phase is complete, processing continues in an operation 644. If the exploitation phase is not complete, processing continues in operation 634 to request a model execution with the next model configuration data.

For illustration, the determination that the exploitation phase is complete may be based on a number of iterations of operation 642 in comparison to a maximum number of iterations specified as an exploit phase option. As another example, the determination that the exploitation phase is complete may be based on an accuracy value computed from or included in the results received in operation 624 in comparison to an exploit phase accuracy specified as an exploit phase option. As another example, the determination that the exploitation phase is complete may be based on a lack of improvement in the accuracy value or the training loss for a predefined number of iterations specified as an exploit phase option.

In an operation 644, final model configuration data 224 may be provided to user device 200 if user device 200 and controller device 104 are not integrated.

In an operation 646, distributed execution of the neural network model with final model configuration data 224 and training dataset 414 may be requested of each of the W number of worker devices 400 of worker system 106 to determine overall training accuracy parameters.

In an operation 648, execution of the neural network model with final model configuration data 224 and validation dataset 416 may be requested of worker device 400 or may be performed by control device 104 to determine overall validation accuracy parameters.

In an operation 650, training and validation results may be provided to user device 200 if user device 200 and controller device 104 are not integrated. For example, overall training and validation accuracy parameters may include a misclassification error and a loss error computed using validation dataset 416, and a misclassification error and a loss error computed using training dataset 414.

Figure 7A:
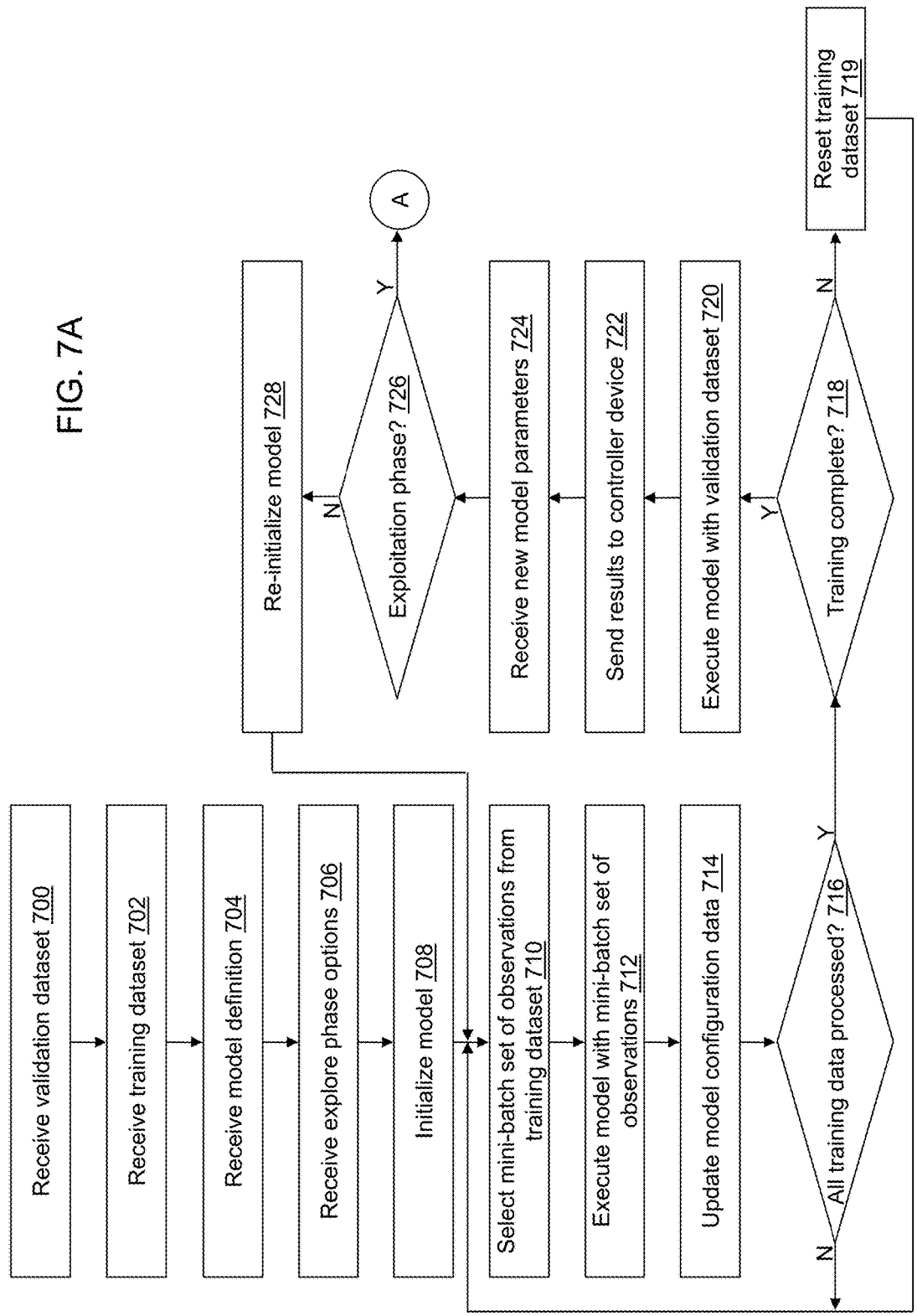
FIGS. 7A and 7B depict a flow diagram illustrating examples of operations performed by the worker device of FIG. 4 in accordance with an illustrative embodiment.
Figure 7B:
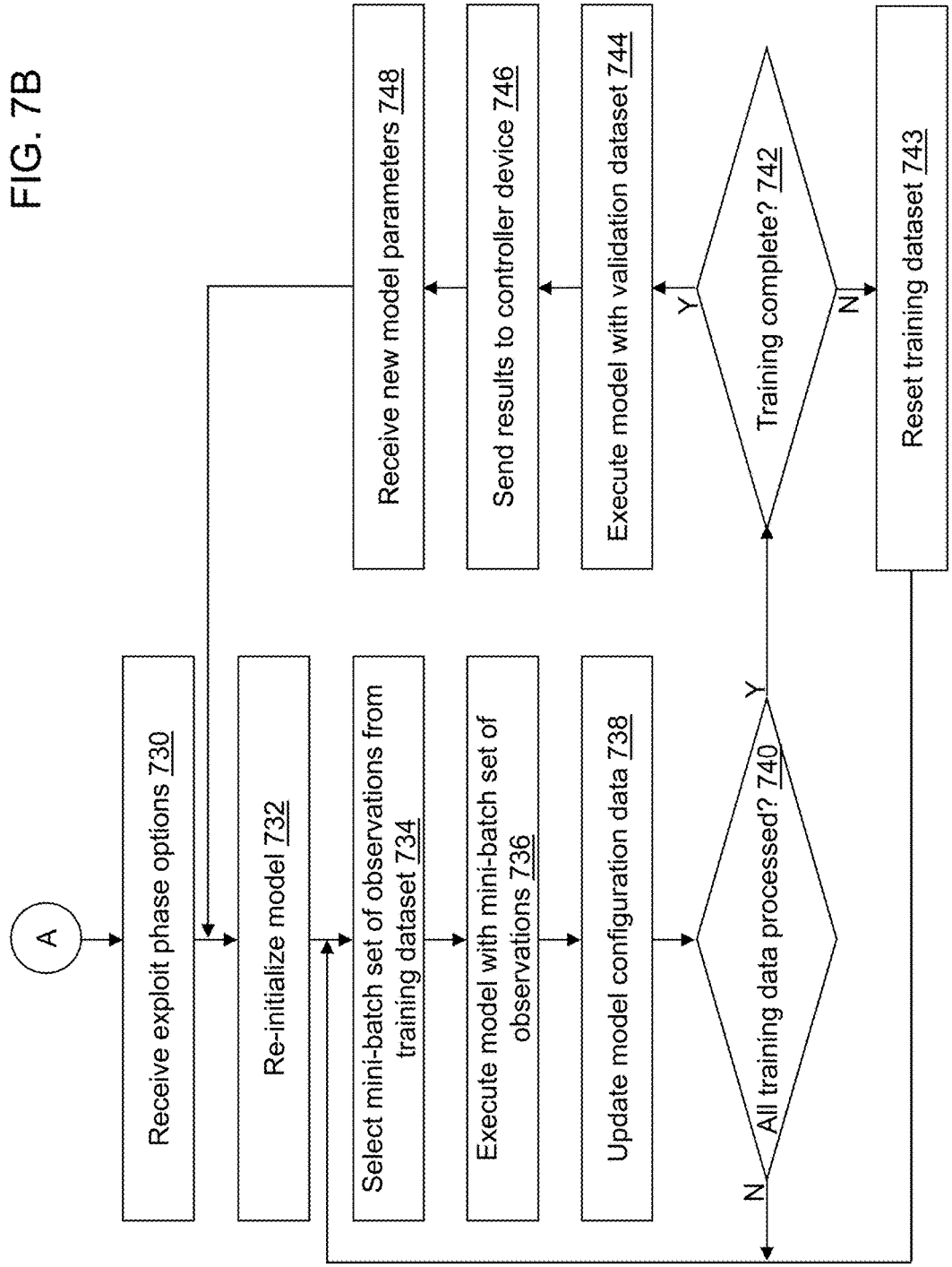

Referring to FIGS. 7A and 7B, example operations associated with model train/score application 412 are described. Additional, fewer, or different operations may be performed depending on the embodiment. The order of presentation of the operations of FIGS. 7A and 7B is not intended to be limiting.

In an operation 700, validation dataset 416 is received. Validation dataset 416 may be received by accessing it from a predefined location or a location provided to worker device 400 by controller 104. As another option, validation dataset 416 may be communicated to worker device 400.

In an operation 702, training dataset 414 is received. Training dataset 414 may be received by accessing it from a predefined location or a location provided to worker device 400 by controller 104. As another option, training dataset 414 may be communicated to worker device 400.

In an operation 704, neural network model definition data is received. The neural network model definition data may be received by accessing it from a predefined location or a location provided to worker device 400 by controller 104. As another option, the neural network model definition data may be communicated to worker device 400.

In an operation 706, explore phase options are received. The explore phase options may be received by accessing them from a predefined location or a location provided to worker device 400 by controller 104. As another option, the explore phase options may be communicated to worker device 400.

In an operation 708, the neural network model is initialized using the neural network model definition data and the explore phase options. In an illustrative embodiment, each worker device 400 is initialized using the same initial values.

In an operation 710, a mini-batch number of observation vectors are randomly selected from training dataset 414 without replacement so that, on successive iterations of operation 710, different observation vectors are selected. The mini-batch number of observation vectors may be defined from a mini-batch size parameter value included in the received explore phase options. For illustration, the mini-batch number of observation vectors may be specified as an explore phase option and may be greater than or equal to one. An illustrative default value may be five. If a number of remaining observations for a last iteration is less that the mini-batch number of observation vectors, additional observation vectors may be selected from the first mini-batch to complete the last mini-batch.

In an operation 712, the initialized neural network model is executed using the selected mini-batch number of observation vectors to determine weight parameter values for links of the defined neural network. For illustration, the Deep Neural Network Action Set included with SAS® Visual Data Mining and Machine Learning 8.2 may be used to train a neural network model.

In an operation 714, model configuration data 418 is updated to include the determined weight parameter values using a local optimization method.

In an operation 716, a determination is made concerning whether or not all of training dataset 414 has been selected in operation 710. If all of training dataset 414 has been processed, processing continues in an operation 718. If all of training dataset 414 has not been processed, processing continues in operation 710 to select a next mini-batch number of observation vectors to continue training the neural network model.

In operation 718, a determination is made concerning whether or not training of the neural network model is complete. If training of the neural network model is complete, processing continues in an operation 720. If training of the neural network model is not complete, processing continues in an operation 719. For illustration, the determination that training of the neural network model is complete may be based on a number of iterations of operation 718 in comparison to a maximum number of iterations specified as an explore phase option, the accuracy, etc.

In operation 719, the mini-batch number of observation vectors are re-initialized to select from an entirety of training dataset 414, and processing continues in operation 710 to select a next mini-batch number of observation vectors to continue training the neural network model.

In operation 720, the trained neural network model is executed using validation dataset 416.

In an operation 722, the execution results are sent to controller device 104. The execution results may include an accuracy value computed in operation 720.

In an operation 724, new neural network model parameters are received that include weight parameter values for the links of the neural network. The weight parameter values for the links of the neural network may be received by accessing them from a predefined location or a location provided to worker device 400 by controller 104. As another option, the new neural network model parameters may be communicated to worker device 400.

In operation 726, a determination is made concerning whether or not the exploitation phase has been entered as indicated by controller device 104. If the exploitation phase has been entered, processing continues in an operation 730 shown referring to FIG. 7B. If the exploitation phase has not been entered, processing continues in operation 728 to re-initialize the neural network model.

In an operation 728, the neural network model is re-initialized using the received weight parameter values for the links of the neural network, and processing continues in operation 710 to repeat the training process. For further illustration, the mini-batch number of observation vectors are also re-initialized to select from an entirety of training dataset 414, any counters are reset, any accuracy computed parameters are re-initialized, etc.

Referring to FIG. 7B, when the exploration phase is complete, and the exploitation phase is initiated, processing continues in operation 730. In operation 730, exploit phase options are received. The exploit phase options may be received by accessing them from a predefined location or a location provided to worker device 400 by controller 104. As another option, the exploit phase options may be communicated to worker device 400.

In an operation 732, the neural network model is re-initialized using the exploit phase options.

In an operation 734, a mini-batch number of observation vectors are randomly selected from training dataset 414 without replacement so that on successive iterations of operation 734 different observation vectors are selected. The mini-batch number of observation vectors may be defined from a mini-batch size parameter value included in the received exploit phase options. For illustration, the mini-batch number of observation vectors may be specified as an exploit phase option and may be greater than or equal to one. An illustrative default value may be five. The mini-batch number of observation vectors specified as an exploit phase option may be different than the mini-batch number of observation vectors specified as an explore phase option.

In an operation 736, the re-initialized neural network model is executed using the selected mini-batch number of observation vectors to update the weight parameter values for the links of the neural network.

In an operation 738, model configuration data 418 is updated to include the updated weight parameter values.

In an operation 740, a determination is made concerning whether or not all of training dataset 414 has been selected in operation 734. If all of training dataset 414 has been processed, processing continues in an operation 742. If all of training dataset 414 has not been processed, processing continues in operation 734 to select a next mini-batch number of observation vectors to continue training the neural network model.

In operation 742, a determination is made concerning whether or not training of the neural network model is complete. If training of the neural network model is complete, processing continues in an operation 744. If training of the neural network model is not complete, processing continues in an operation 743. For illustration, the determination that training of the neural network model is complete may be based on a number of iterations of operation 742 in comparison to a maximum number of iterations specified as an exploit phase option, the accuracy, etc.

In operation 743, the mini-batch number of observation vectors are re-initialized to select from an entirety of training dataset 414, and processing continues in operation 734 to select a next mini-batch number of observation vectors to continue training the neural network model.

In operation 744, the trained neural network model is executed using validation dataset 416.

In an operation 746, the execution results are sent to controller device 104. The execution results may include an accuracy value computed in operation 744.

In an operation 748, new neural network model parameters are received that include weight parameter values for the links of the neural network, and processing continues in operation 732 to continue training the neural network model. The weight parameter values for the links of the neural network may be received by accessing it from a predefined location or a location provided to worker device 400 by controller 104.

Figure 8B:
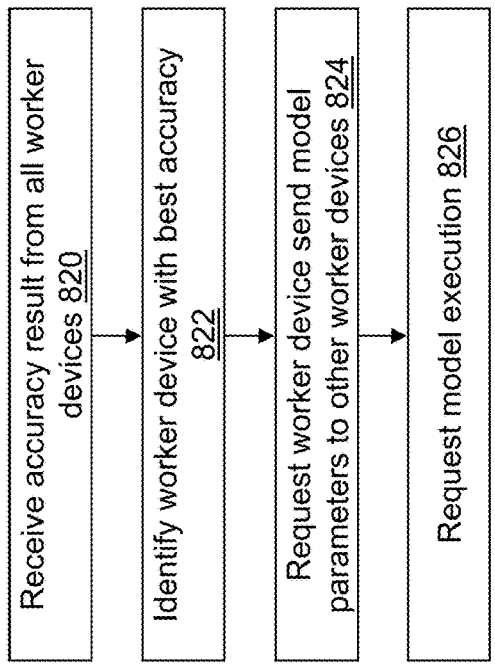
FIGS. 8A to 8E depict a flow diagram illustrating additional examples of operations performed by the manager device of FIG. 3 in accordance with an illustrative embodiment.
Figure 8A:
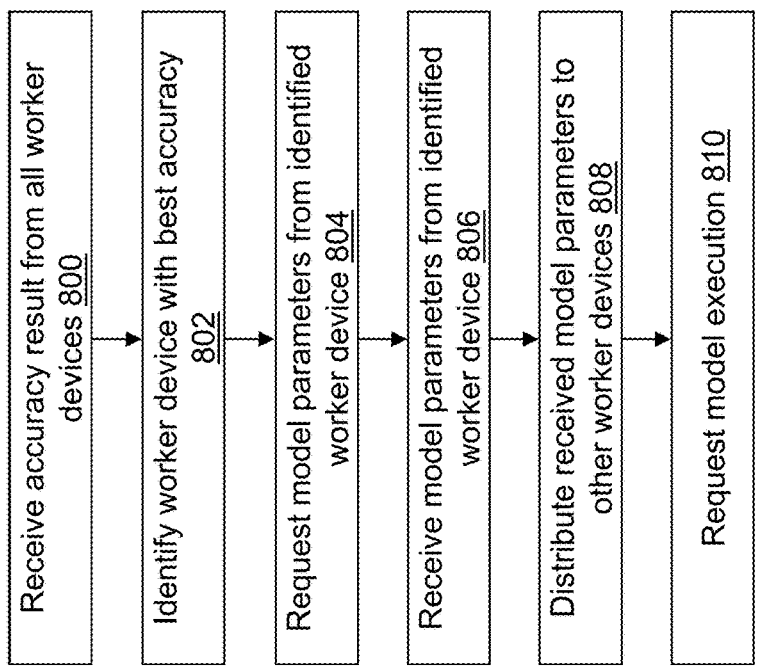

Referring to FIG. 8A, additional example operations associated with manager application 312 are described for a first EE method. Additional, fewer, or different operations may be performed depending on the embodiment. The order of presentation of the operations of FIG. 8A is not intended to be limiting. The first EE method selects a best model with controller device 104 synchronously distributing the selected best model parameters to worker system 106.

In an operation 800, an accuracy result is received from all worker devices 400 of worker system 106. The accuracy result may be computed based on results from operation 720. Operation 800 is an example of operation 624, and the accuracy result is an example of a result sent by each worker device 400 in operation 722.

In an operation 802, worker device 400 having the best accuracy result (e.g., highest accuracy value, lowest error value) is identified from worker system 106. Operation 802 is an example of performing operation 626.

In an operation 804, the neural network model parameters for the neural network model trained by the identified worker device 400 are requested from the identified worker device 400.

In an operation 806, requested neural network model parameters are received from the identified worker device 400. Operations 804 and 806 are examples of performing operation 626, and the neural network model parameters are another example of a result sent by each worker device 400 in operation 722 though there may be multiple communications.

In an operation 808, the received neural network model parameters are distributed to the other worker devices 400 of worker system 106. Operation 808 is an example of operation 628.

In an operation 810, execution of the neural network model to be trained is requested of each of the W number of worker devices 400 of worker system 106. Operation 810 is an example of operation 622.

Referring to FIG. 8B, additional example operations associated with manager application 312 are described for a second EE method. Additional, fewer, or different operations may be performed depending on the embodiment. The order of presentation of the operations of FIG. 8B is not intended to be limiting. The second EE method selects a best model with worker device 400 having the selected best model synchronously distributing the selected best model parameters to other worker devices 400 of worker system 106.

Similar to operation 800, in an operation 820, an accuracy result is received from all worker devices 400 of worker system 106. Operation 800 is an example of operation 624 and the accuracy result is an example of a result sent by each worker device 400 in operation 722.

Similar to operation 802, in an operation 822, worker device 400 having the best accuracy result (e.g., highest accuracy value, lowest error value) is identified from worker system 106. Operation 822 is an example of performing operation 626.

In an operation 824, the identified worker device is requested to send its neural network model parameters to the other worker devices 400 of worker system 106. Operation 824 is an example of performing operation 628.

In an operation 826, execution of the neural network model to be trained is requested of each of the W number of worker devices 400 of worker system 106. Operation 826 is an example of operation 622.

Figure 8C:
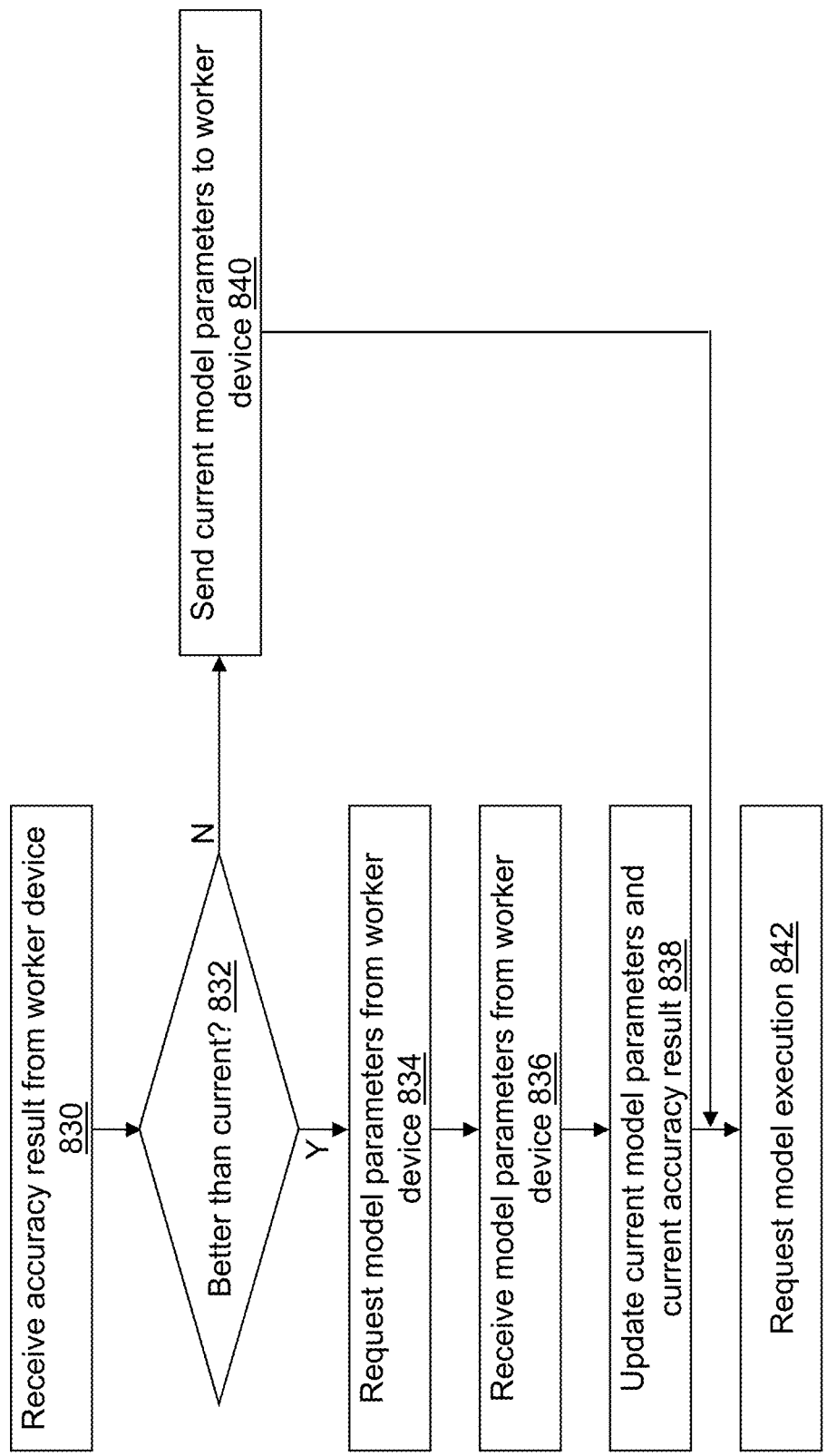

Referring to FIG. 8C, additional example operations associated with manager application 312 are described for a third EE method. Additional, fewer, or different operations may be performed depending on the embodiment. The order of presentation of the operations of FIG. 8C is not intended to be limiting. The third EE method selects a best model with controller device 104 asynchronously distributing the selected best model parameters to worker system 106.

Similar to operation 800, in an operation 820, an accuracy result is received from worker device 400 of worker system 106. Operation 800 is an example of operation 624.

In an operation 832, a determination is made concerning whether or not the received accuracy result is better than a current accuracy result. If the received accuracy result is better than a current accuracy result, processing continues in an operation 834. If the received accuracy result is not better than a current accuracy result, processing continues in an operation 840. In an illustrative embodiment, the current accuracy result may be initialized to a large value before operation 622 is performed for a first iteration. As another option, the current accuracy result may be initialized to zero or a negative value before operation 622 is performed for a first iteration when the current accuracy result represents an error value. In this manner, for a first iteration of operation 832, the received accuracy result is always "better" than a current accuracy result.

Similar to operation 804, in operation 834, model parameters are requested from the worker device 400. Operation 834 is an example of performing operation 626.

Similar to operation 806, in an operation 836, the requested neural network model parameters are received from the worker device 400. Operations 834 and 836 are examples of performing operation 626, and the neural network model parameters are another example of a result sent by each worker device 400 in operation 722 though there may be multiple communications.

In an operation 838, current model parameters and the current accuracy result are updated with the values received in operations 836 and 830, respectively.

In operation 840, the current model parameters are sent to worker device 400. Operation 840 is an example of performing operation 628.

In an operation 842, execution of the neural network model to be trained is requested of worker device 400 of worker system 106. Operation 842 is an example of operation 622. Operations 830 to 842 are repeated as results are received from each worker device 400 of worker system 106 to provide asynchronous updating of model parameters for each worker device 400 that has not achieved a better accuracy than the current "best" accuracy. For each worker device 400 of worker system 106 that has achieved a better accuracy, controller device 104 updates its current values while that worker device 400 continues to train without updating its model parameters.

Figure 8E:
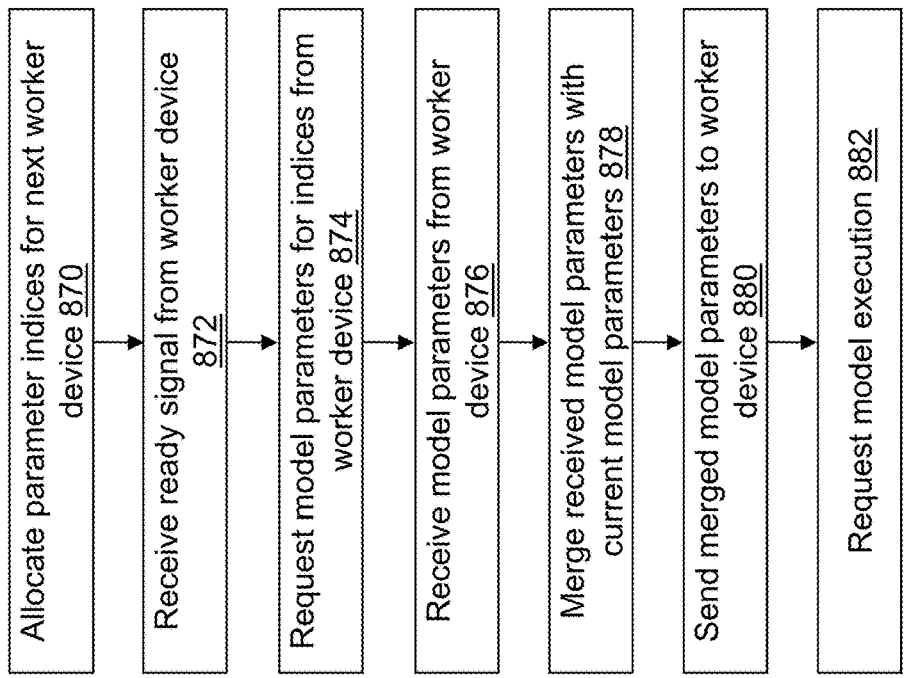
Figure 8D:
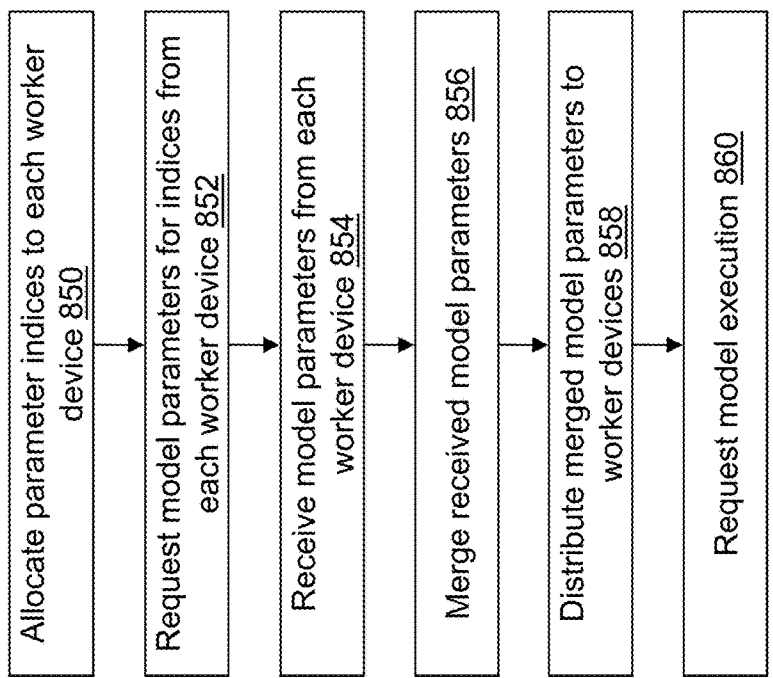

Referring to FIG. 8D, additional example operations associated with manager application 312 are described for a fourth EE method. Additional, fewer, or different operations may be performed depending on the embodiment. The order of presentation of the operations of FIG. 8D is not intended to be limiting. The fourth EE method selects random model parameters with controller device 104 synchronously distributing the selected best model parameters to worker system 106.

In an operation 850, parameter indices for each worker device 400 are allocated. For example, for a neural network model definition resulting in 10,000 weight parameters and for W=5 number of worker devices 400 of worker system 106, 2,000 weight parameter indices are randomly selected without replacement and allocated to each worker device 400 of worker system 106. As a simple example with ten parameters and five worker devices 400, the following parameter indices may be determined for each worker device as: worker device 400a {3,7}; worker device 400a {1,9}, worker device 400a {0,6}; worker device 400a {4,5}; and worker device 400a {2,8}, where the ten parameter indices from 0 to 9 are approximately evenly allocated. For illustration, within a loop over the possible indices, a uniform random draw is made to select which worker device 400 of worker system 106 is allocated the parameter index. Different parameter indices may be determined for each worker device 400 of worker system 106 for each iteration of operation 850, which is performed after operation 620 and before operation 622.

In general, a convolution layer accepts a volume of size W1×H1×D1, where W references a width, H references a height, and D references a depth, and requires four hyperparameters: a number of filters K, their spatial extent F, a stride S, and an amount of zero padding P. The convolution layer produces a volume of size W2×H2×D2 where W2=(W1−F+2P)/S+1, H2=(H1−F+2P)/S+1, and D2=KD. With parameter sharing, the convolution layer introduces F*F*D1 weights per filter, for a total of (F*F*D1)*K weights and K biases.

A pooling layer accepts a volume of size W1×H1×D1 and requires two hyperparameters: their spatial extent F and the stride S. The pooling layer produces a volume of size W2×H2×D2 where W2=(W1−F)/S+1, H2=(H1−F)/S+1, and D2=D1. the pooling layer does not introduce any parameters.

An example of total parameters distributed by index is provided in Table I below:

TABLE I

| Layer | Hyperparameters | Number of Weights | Number of Biases |
| --- | --- | --- | --- |
| Data | 28 × 28 1 channel | | |
| conv1 + Relu + maxpool | 5 × 5 32 features | (5*5*1)*32 = 800 | 32 |
| conv2 + Relu + maxpool | 5 × 5 64 features | (5*5*32)*64 = 51,200 | 64 |
| Fully connected | 1024 neurons | (7*7*64)*1024 = 3,211,264 | 1,024 |
| Output | Softmax | 1024*10 = 10,240 | 10 |
| | | 3,273,504 | 1,130 |

"Relu" references a rectified linear unit for the hidden layers. "Softmax" references a softmax function unit for the hidden layers that squashes the outputs of each unit to be between 0 and 1 and divides each output such that the total sum of the outputs is equal to 1.

In an operation 852, a request to provide values for model parameters based on the determined indices is sent to each worker device 400. For example, a list of indices is sent to each worker device 400 of worker system 106 based on the parameter indices allocated to each worker device 400.

In an operation 854, values for the listed model parameters are received from each worker device 400 of worker system 106. Operations 852 and 854 are examples of operation 624, and the values for the listed model parameters are an example of a result sent by each worker device 400 in operation 722.

In an operation 856, the received values are merged to form a single set of model parameters. Operation 856 is an example of operation 626.

In an operation 858, the merged model parameters are distributed to the other worker devices 400 of worker system 106. Operation 858 is an example of operation 628.

In an operation 860, execution of the neural network model to be trained is requested of each worker device 400 of worker system 106. Operation 860 is an example of operation 622.

Referring to FIG. 8E, additional example operations associated with manager application 312 are described for a fifth EE method. Additional, fewer, or different operations may be performed depending on the embodiment. The order of presentation of the operations of FIG. 8E is not intended to be limiting. The fifth EE method selects random model parameters with controller device 104 asynchronously distributing the selected best model parameters to worker system 106.

Similar to operation 850, in an operation 870, parameter indices for each worker device 400 are allocated.

In an operation 872, a ready signal is received from worker device 400 indicating that worker device 400 has completed operation 722. The ready signal is an example of a result sent by each worker device 400 in operation 722.

In an operation 874, a request to provide values for model parameters based on the determined indices is sent to worker device 400 from which the ready signal was received in operation 872. For example, the list of indices is sent to worker device 400 of worker system 106 based on the parameter indices allocated to worker device 400.

In an operation 876, values for the listed model parameters are received from worker device 400 to which the request was sent in operation 874. Operations 874 and 876 are examples of operation 624, and the values for the listed model parameters are an example of a result sent by worker device 400 in operation 722.

In an operation 878, the received values are merged with current model parameter values to form a single set of model parameters. For example, when the ready signal is received for the first time from a first worker device of worker system 106, the other current model parameter values may be default values defined as part of initialization. Operation 878 is an example of operation 626.

In an operation 880, the merged model parameters are distributed to the worker device 400 from which the values were received in operation 876. Operation 858 is an example of operation 628.

In an operation 882, execution of the neural network model to be trained is requested of worker device 400 to which the merged model parameters were distributed in operation 880. Operation 882 is an example of operation 622. Operations 870 to 882 are repeated as results are received from each worker device 400 of worker system 106 to provide asynchronous updating of model parameters for each worker device 400 based on the determined parameter indices.

Figure 9:
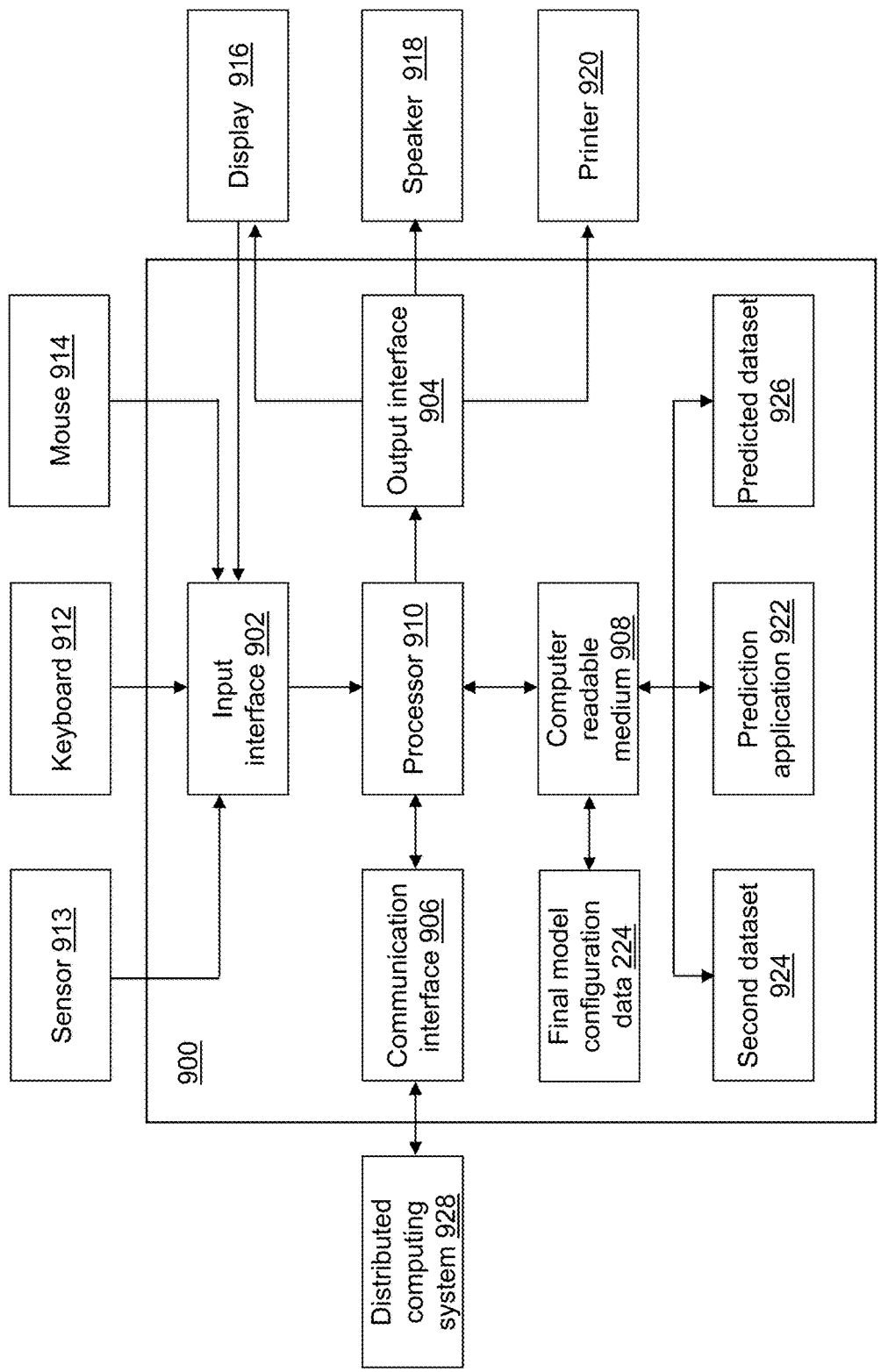
FIG. 9 depicts a block diagram of a prediction device in accordance with an illustrative embodiment.

Referring to FIG. 9, a block diagram of a prediction device 900 is shown in accordance with an illustrative embodiment. Prediction device 900 may include a fourth input interface 902, a fourth output interface 904, a fourth communication interface 906, a fourth non-transitory computer-readable medium 908, a fourth processor 910, a prediction application 922, final model configuration data 224, a second dataset 924, and predicted dataset 926. Fewer, different, and/or additional components may be incorporated into prediction device 900. Prediction device 900 and user device 200 and/or controller device 104 may be the same or different devices.

Fourth input interface 902 provides the same or similar functionality as that described with reference to input interface 202 of user device 200 though referring to prediction device 900. Fourth output interface 904 provides the same or similar functionality as that described with reference to output interface 204 of user device 200 though referring to prediction device 900. Fourth communication interface 906 provides the same or similar functionality as that described with reference to communication interface 206 of user device 200 though referring to prediction device 900. Data and messages may be transferred between prediction device 900 and a distributed computing system 928 using fourth communication interface 906. Fourth computer-readable medium 908 provides the same or similar functionality as that described with reference to computer-readable medium 208 of user device 200 though referring to prediction device 900. Fourth processor 910 provides the same or similar functionality as that described with reference to processor 210 of user device 200 though referring to prediction device 900.

Prediction application 922 performs operations associated with classifying or predicting a characteristic of second dataset 924 that is stored in predicted dataset 926 to support various data analysis functions as well as provide alert/messaging related to the classified/predicted data. Dependent on the type of data stored in input dataset 314 and second dataset 924, prediction application 922 may identify anomalies as part of process control, for example, of a manufacturing process, for machine condition monitoring, for example, an electro-cardiogram device, for image classification, for intrusion detection, for fraud detection, etc. Some or all of the operations described herein may be embodied in prediction application 922. The operations may be implemented using hardware, firmware, software, or any combination of these methods.

Referring to the example embodiment of FIG. 9, prediction application 922 is implemented in software (comprised of computer-readable and/or computer-executable instructions) stored in fourth computer-readable medium 908 and accessible by fourth processor 910 for execution of the instructions that embody the operations of prediction application 922. Prediction application 922 may be written using one or more programming languages, assembly languages, scripting languages, etc. Prediction application 922 may be integrated with other analytic tools. As an example, prediction application 922 may be part of an integrated data analytics software application and/or software architecture such as that offered by SAS Institute Inc. of Cary, N.C., USA. For example, prediction application 922 may be part of SAS® Enterprise Miner™ developed and provided by SAS Institute Inc. of Cary, N.C., USA. Merely for further illustration, prediction application 922 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of prediction application 922 further may be performed by an ESPE. Prediction application 922, model training application 222, manager application 312, and/or model train/score application 412 may be the same or different applications that are integrated in various manners to execute a neural network model using input dataset 314 and/or second dataset 924.

Prediction application 922 may be implemented as a Web application. Prediction application 922 may be integrated with other system processing tools to automatically process data generated as part of operation of an enterprise, to classify data in the processed data, and/or to provide a warning or alert associated with the data classification using fourth input interface 902, fourth output interface 904, and/or fourth communication interface 906 so that appropriate action can be initiated in response. For example, a warning or an alert may be presented using a second display 916, a second speaker 918, a second printer 920, etc. or sent to one or more computer-readable media, display, speaker, printer, etc. of distributed computing system 928.

Input dataset 314 and second dataset 924 may be generated, stored, and accessed using the same or different mechanisms. Similar to input dataset 314, second dataset 924 may include a plurality of rows and a plurality of columns with the plurality of rows referred to as observations or records, and the columns referred to as variables that are associated with an observation. Second dataset 924 may be transposed.

Similar to input dataset 314, second dataset 924 may be stored on fourth computer-readable medium 908 or on one or more computer-readable media of distributed computing system 928 and accessed by prediction device 900 using fourth communication interface 906. Data stored in second dataset 924 may be a sensor measurement or a data communication value, for example, from a sensor 913, may be generated or captured in response to occurrence of an event or a transaction, generated by a device such as in response to an interaction by a user with the device, for example, from a second keyboard 912 or a second mouse 914, etc. The data stored in second dataset 924 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 924 may be captured at different time points periodically, intermittently, when an event occurs, etc. One or more columns may include a time value. Similar to input dataset 314, data stored in second dataset 924 may be generated as part of the IoT, and some or all data may be pre- or post-processed by an ESPE.

Similar to input dataset 314, second dataset 924 may be stored in various compressed formats such as a coordinate format, a compressed sparse column format, a compressed sparse row format, etc. Second dataset 924 further may be stored using various structures as known to those skilled in the art including a file system, a relational database, a system of tables, a structured query language database, etc. on prediction device 900 and/or on distributed computing system 928. Prediction device 900 and/or distributed computing system 928 may coordinate access to second dataset 924 that is distributed across a plurality of computing devices that make up distributed computing system 928. For example, second dataset 924 may be stored in a cube distributed across a grid of computers as understood by a person of skill in the art. As another example, second dataset 924 may be stored in a multi-node Hadoop® cluster. As another example, second dataset 924 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second dataset 924.

Figure 10:
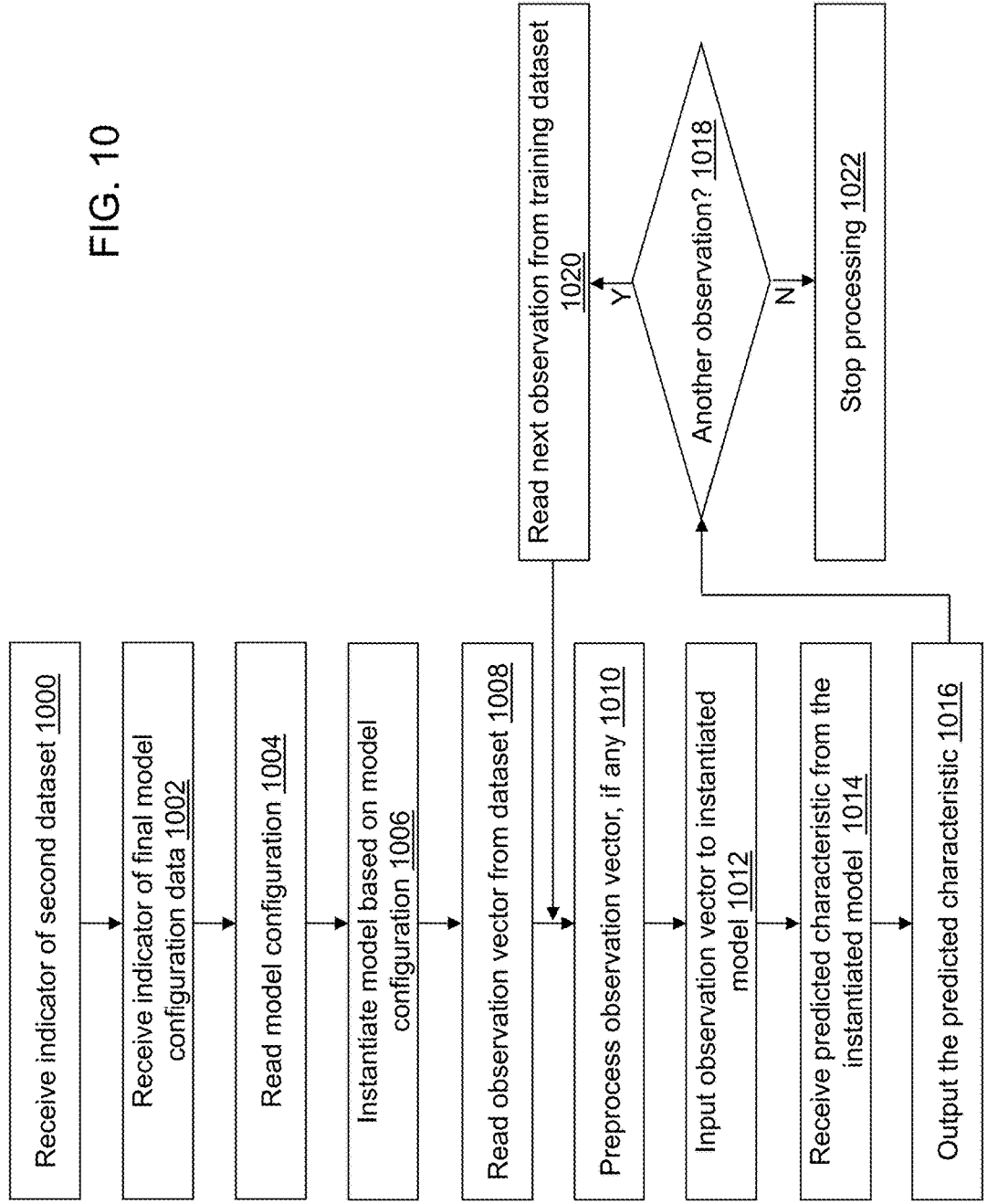
FIG. 10 depicts a flow diagram illustrating examples of operations performed by the prediction device of FIG. 9 in accordance with an illustrative embodiment.

Referring to FIG. 10, example operations of prediction application 922 are described. Additional, fewer, or different operations may be performed depending on the embodiment of prediction application 922. The order of presentation of the operations of FIG. 10 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 1000, a sixth indicator may be received that indicates second dataset 924. For example, the sixth indicator indicates a location and a name of second dataset 924. As an example, the sixth indicator may be received by prediction application 922 after selection from a user interface window or after entry by a user into a user interface window. In an alternative embodiment, second dataset 924 may not be selectable. For example, a most recently created dataset may be used automatically.

In an operation 1002, a seventh indicator may be received that indicates final model configuration data 224. For example, the seventh indicator indicates a location and a name of final model configuration data 224. As an example, the seventh indicator may be received by prediction application 922 after selection from a user interface window or after entry by a user into a user interface window. In an alternative embodiment, final model configuration data 224 may not be selectable. For example, a most recently created model configuration data may be used automatically. As another example, final model configuration data 224 may be provided automatically as part of integration with model training application 222, manager application 312, and/or model train/score application 412.

In an operation 1004, a neural network model description is read from final model configuration data 224.

In an operation 1006, a neural network model is instantiated with the neural network model description. For example, the type of model, its hyperparameters, and other characterizing elements are read and used to instantiate a neural network model.

In an operation 1008, an observation vector is read from second dataset 924.

In an operation 1010, the observation vector is preprocessed, if any pre-processing is performed.

In an operation 1012, the optionally pre-processed observation vector is input to the instantiated model.

In an operation 1014, an output of the instantiated model is received. The output may indicate a predicted characteristic computed from the observation vector using the instantiated model.

In an operation 1016, the predicted characteristic may be output, for example, by storing the predicted characteristic with the observation vector to predicted dataset 926. In addition, or in the alternative, the predicted characteristic may be presented on second display 916, printed on second printer 920, sent to another computing device using fourth communication interface 906, an alarm or other alert signal may be sounded through second speaker 918, etc.

In an operation 1018, a determination is made concerning whether or not second dataset 924 includes another observation vector. When second dataset 924 includes another observation vector, processing continues in an operation 1020. When second dataset 924 does not include another observation vector, processing continues in an operation 1022.

In operation 1020, a next observation vector is read from second dataset 924, and processing continues in operation 1010.

In operation 1022, processing stops and cleanup is performed as needed.

Tests were performed using a grid of computers with worker system 106 that included five worker nodes. An image classification task with a convolutional neural network was used as a test case. The neural network model definition includes 21 layers with one input layer and one output layer where the input is an image and the output is an image category. The convolutional neural network consisted of 13 convolutional layers, five pooling layers, and one fully connected layer. The convolutional neural network included approximately 20 million parameters. Input dataset 314 contained sixty-thousand images with fifty-thousand training images distributed into training datasets 414 stored by each of the five worker devices 400 and ten-thousand test images included in validation dataset 416 stored by each of the five worker devices 400 with ten different image categories that included "airplane", "automobile", "bird", "cat", "deer", "dog", "frog", "horse", "ship", and "truck".

Table II below presents a list of additional input parameters to train the convolutional neural network to perform the image classification task:

TABLE II

| Layer Id | Layer | Hyperparameters |
|---|---|---|
| 1 | Input (Data) | 32 × 32 3 channels |
| 2 | Convolution with Relu Activation | 3 × 3 Stride of 1 with same output size 64 Features (Filters) |
| 3 | Convolution with Relu Activation | 3 × 3 Stride of 1 with same output size 64 Features (Filters) |
| 4 | Max Pooling with drop out 0.3 | 2 × 2 Stride of 2 |
| 5 | Convolution with Relu Activation | 3 × 3 Stride of 1 with same output size 128 Features (Filters) |
| 6 | Convolution with Relu Activation | 3 × 3 Stride of 1 with same output size 128 Features (Filters) |
| 7 | Max Pooling with drop out 0.4 | 2 × 2 Stride of 2 |
| 8 | Convolution with Relu Activation | 3 × 3 Stride of 1 with same output size 256 Features (Filters) |
| 9 | Convolution with Relu Activation | 3 × 3 Stride of 1 with same output size 256 Features (Filters) |
| 10 | Convolution with Relu Activation | 3 × 3 Stride of 1 with same output size 256 Features (Filters) |
| 11 | Max Pooling with drop out 0.4 | 2 × 2 Stride of 2 |
| 12 | Convolution with Relu Activation | 3 × 3 Stride of 1 with same output size 512 Features (Filters) |
| 13 | Convolution with Relu Activation | 3 × 3 Stride of 1 with same output size 512 Features (Filters) |
| 14 | Convolution with Relu Activation | 3 × 3 Stride of 1 with same output size 512 Features (Filters) |
| 15 | Max Pooling with drop out 0.4 | 2 × 2 Stride of 2 |
| 16 | Convolution with Relu Activation | 3 × 3 Stride of 1 with same output size 512 Features (Filters) |
| 17 | Convolution with Relu Activation | 3 × 3 Stride of 1 with same output size 512 Features (Filters) |
| 18 | Convolution with Relu Activation | 3 × 3 Stride of 1 with same output size 512 Features (Filters) |
| 19 | Max Pooling with drop out 0.4 | 2 × 2 Stride of 2 |
| 20 | Fully Connected | 512 Neurons |
| 21 | Output (Fully Connected) | Softmax Output dimension 10 |

Table III below presents the results in terms of training and testing performance as well as a computation time per epoch and a total computation time.

TABLE III

| Method | Val Acc. | Train Acc. | Val Loss | Train Loss | Sec/ Epoch | Iter- ations | Total Time |
|---|---|---|---|---|---|---|---|
| Sync | 85.94 | 99.860 | 0.5693 | 0.0087 | 464.5 | 65 | 30,192.51 |
| Async | 85.53 | 99.992 | 0.5702 | 0.0080 | 309.6 | 90 | 27,859.76 |
| Elastic | 85.79 | 99.996 | 0.5522 | 0.0040 | 254.2 | 90 | 22,878.18 |
| EE 4 | 86.33 | 99.934 | 0.5400 | 0.0077 | 244.7 | 90 | 22,024.71 |
| EE 5 | 84.31 | 97.270 | 0.5902 | 0.0787 | 233.8 | 90 | 21,044.19 |

As understood by a person of skill in the art, an "epoch" is a complete processing of training dataset 414 by worker device 400. "Val" indicates a validation result computed using validation dataset 416. "Train" indicates a training result computed using training dataset 414. "Acc" indicates an accuracy value computed based on a percentage of correct classifications. "Sync" indicates the synchronous method described in Chaudhari, P., et al., *Entropy-SGD: Biasing Gradient Descent Into Wide Valleys*, ICLR (2017) referred to as the prior synchronous method below. "Async" indicates the asynchronous method described in Dean, J., et al, *Large Scale Distributed Deep Networks*, NIPS'12 Proceedings of the 25th International Conference on Neural Information Processing Systems, Vol. 1, 1223-1231 (2012) referred to as the first prior asynchronous method below. "Elastic" indicates the asynchronous method described in Zhang, S., et al, *Deep learning with elastic averaging SGD*, NIPS'15 Proceedings of the 28th International Conference on Neural Information Processing Systems, Vol. 1, 685-693 (2015) referred to as the second prior asynchronous method below. "EE 4" indicates computations using neural network training system 100 using the operations of FIGS. 6, 7A, 7B, and 8D. "EE 5" indicates computations using neural network training system 100 using the operations of FIGS. 6, 7A, 7B, and 8E. The results indicate that EE 4 found the best model among the other variants. EE 5 computed a result fastest with a comparable accuracy.

Figure 11:
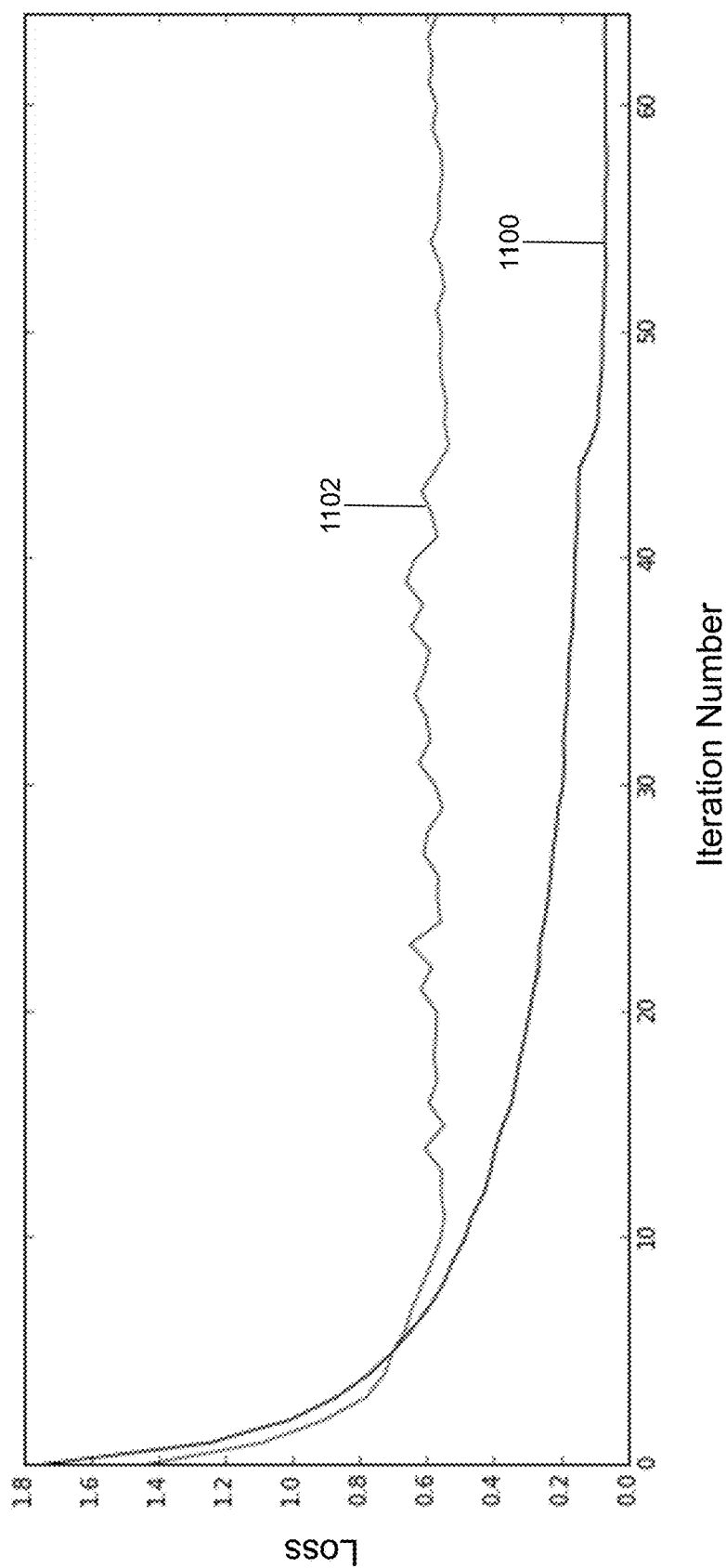
FIG. 11 shows a training loss and a validation loss computed using a prior synchronous method in accordance with an illustrative embodiment.
Figure 12:
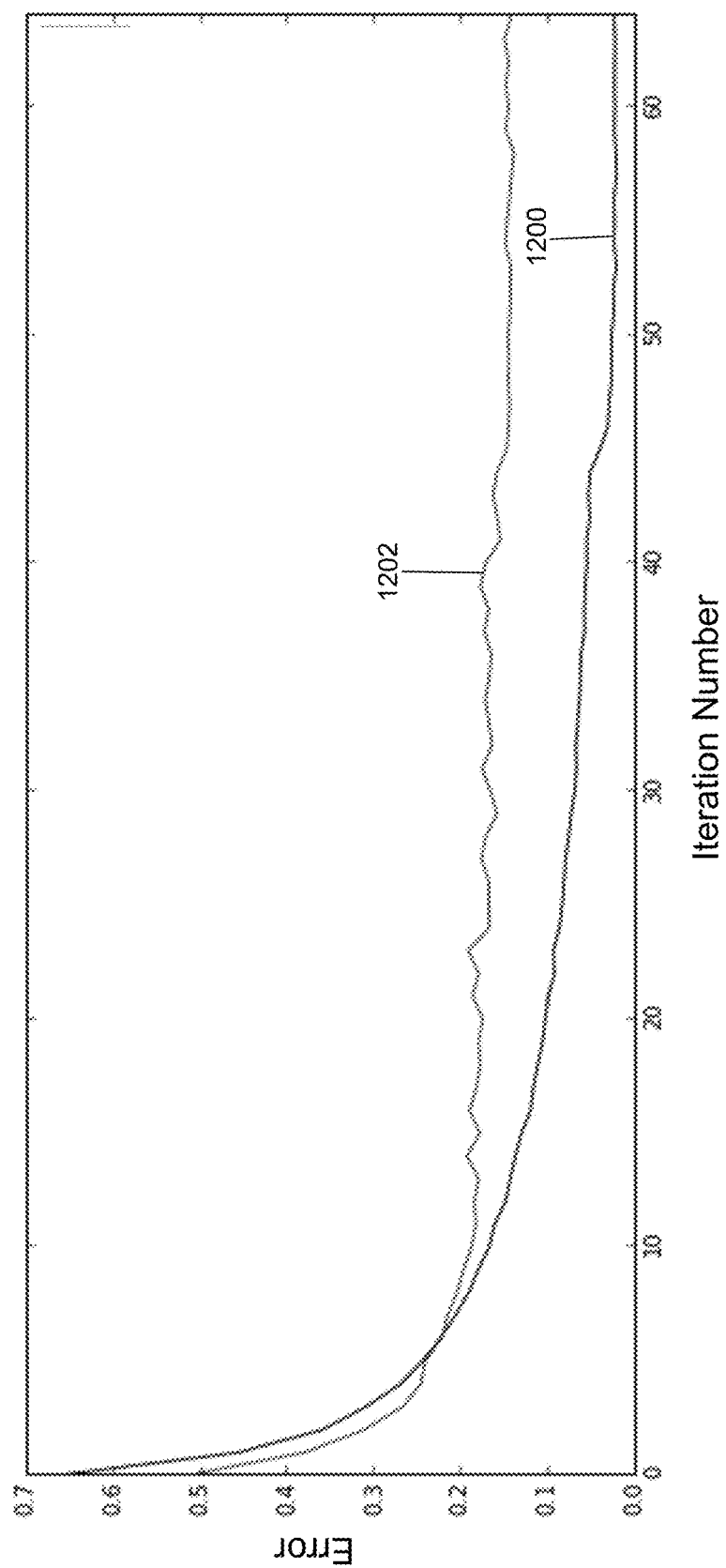
FIG. 12 shows a training error and a validation error computed using the prior synchronous method in accordance with an illustrative embodiment.

FIGS. 11-20 present a training loss and a validation loss as a function of iteration number and a training error and a validation error as a function of iteration number for each method, respectively. The training error and the validation error are each one minus the training accuracy and the validation accuracy, respectively. Referring to FIG. 11, a training loss curve 1100 and a validation loss curve 1102 computed using the prior synchronous method are shown. Referring to FIG. 12, a training error 1200 and a validation error 1202 computed using the prior synchronous method are shown.

Figure 13:
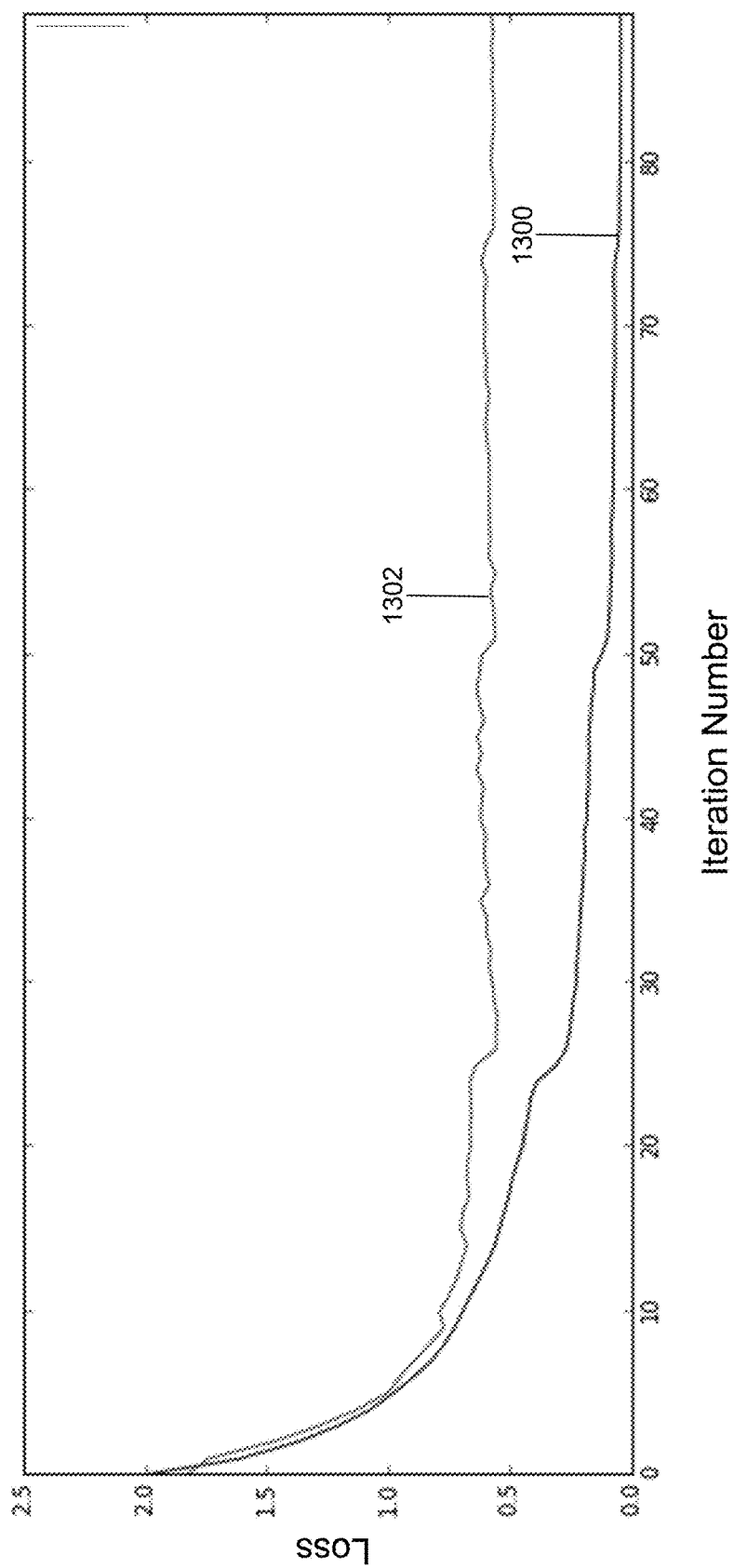
FIG. 13 shows a training loss and a validation loss computed using a first prior asynchronous method in accordance with an illustrative embodiment.
Figure 14:
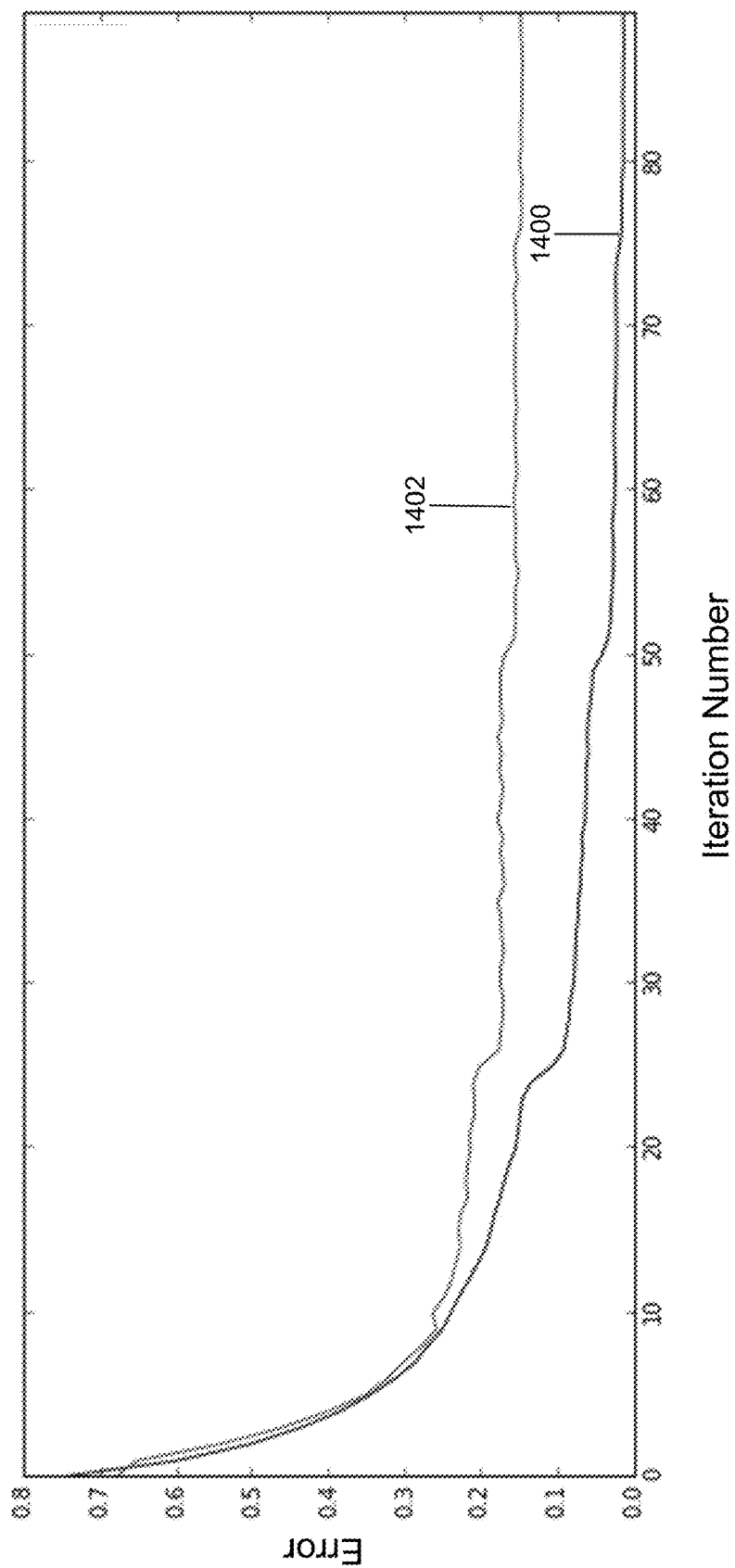
FIG. 14 shows a training error and a validation error computed using the first prior asynchronous method in accordance with an illustrative embodiment.

Referring to FIG. 13, a training loss curve 1300 and a validation loss curve 1302 computed using the first prior asynchronous method are shown. Referring to FIG. 14, a training error 1400 and a validation error 1402 computed using the first prior asynchronous method are shown.

Figure 15:
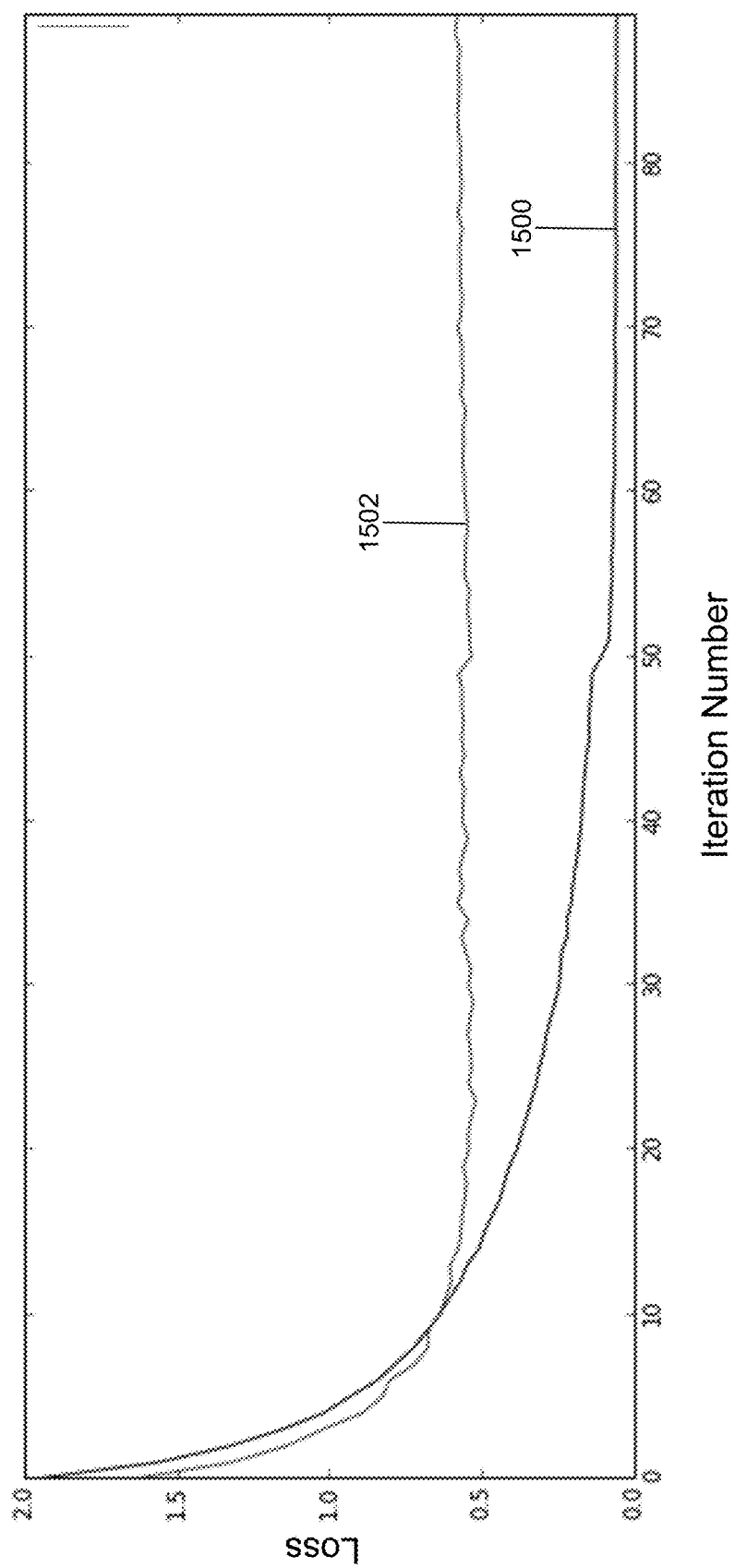
FIG. 15 shows a training loss and a validation loss computed using a second prior asynchronous method in accordance with an illustrative embodiment.
Figure 16:
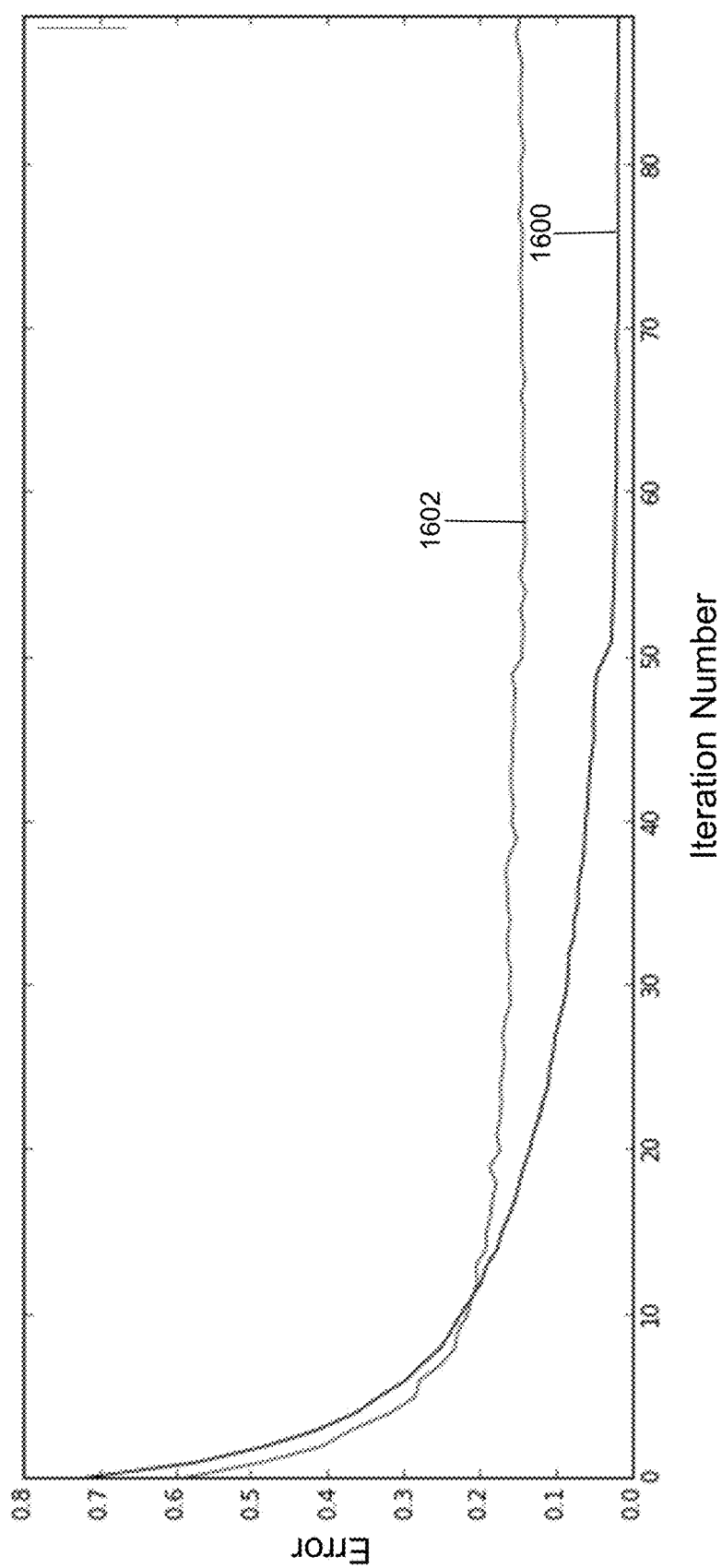
FIG. 16 shows a training error and a validation error computed using the second prior asynchronous method in accordance with an illustrative embodiment.

Referring to FIG. 15, a training loss curve 1500 and a validation loss curve 1502 computed using the second prior asynchronous method are shown. Referring to FIG. 16, a training error 1600 and a validation error 1602 computed using the second prior asynchronous method are shown.

Figure 17:
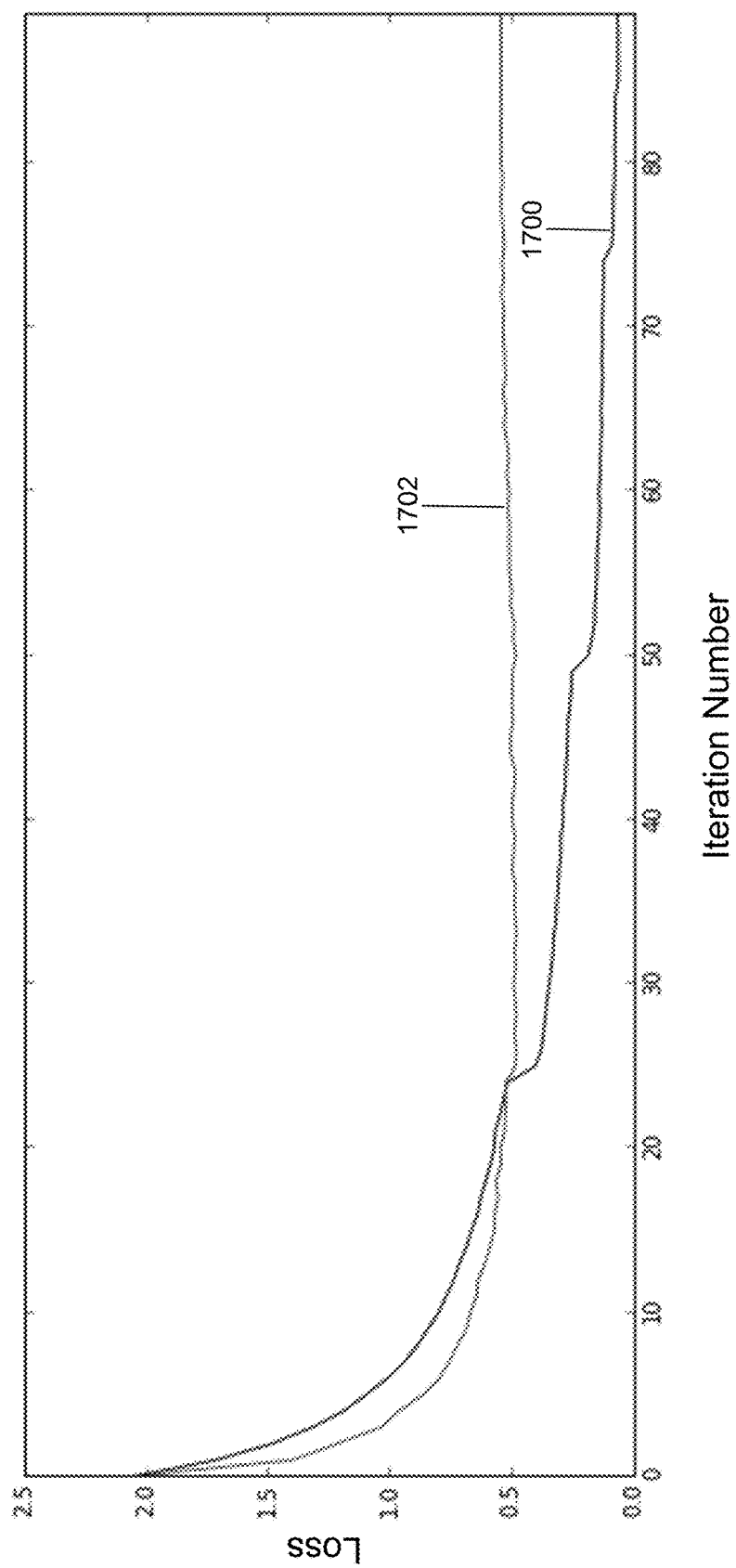
FIG. 17 shows a training loss and a validation loss computed by the neural network training system of FIG. 1 using the operations of FIGS. 6, 7A, 7B, and 8D in accordance with an illustrative embodiment.
Figure 18:
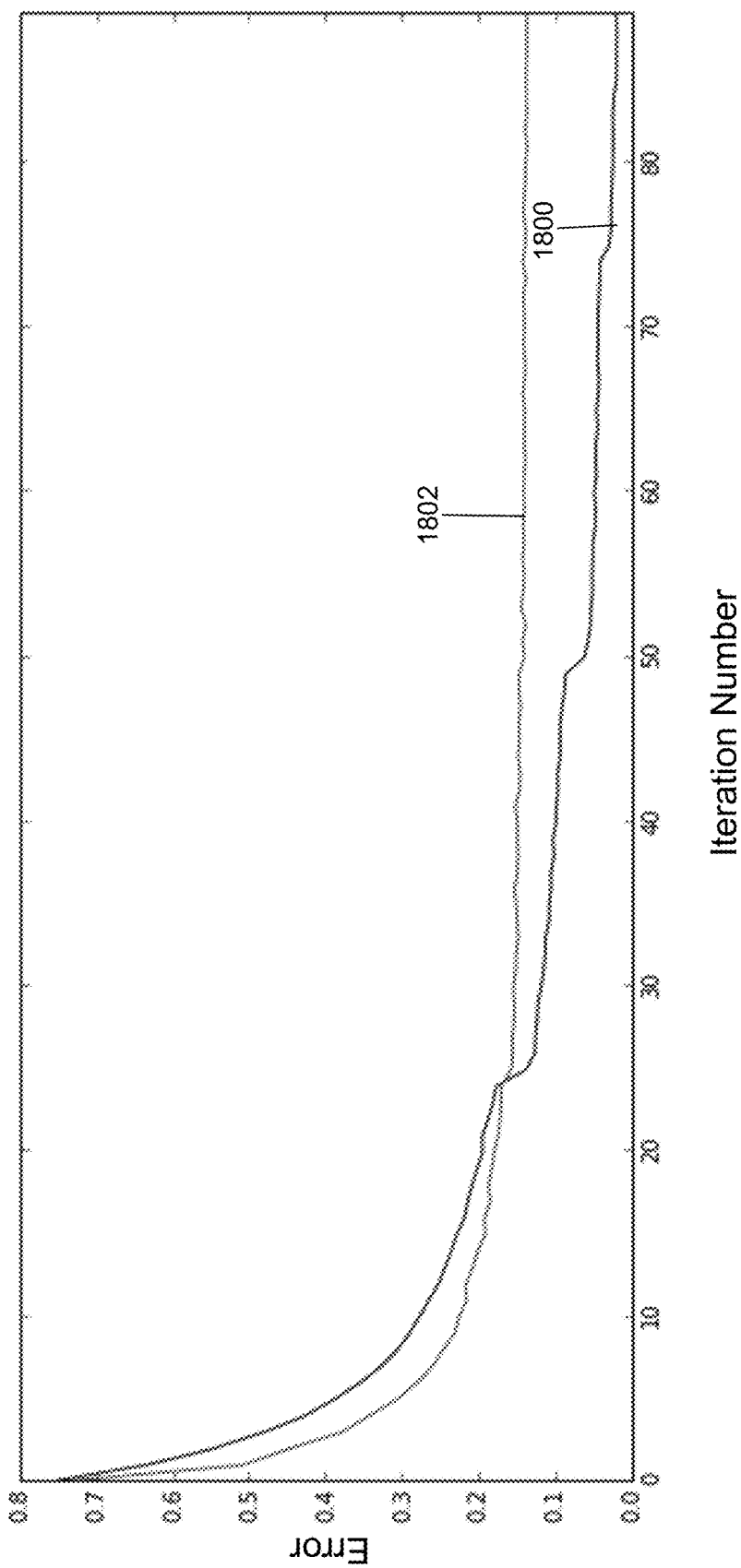
FIG. 18 shows a training error and a validation error computed by the neural network training system of FIG. 1 using the operations of FIGS. 6, 7A, 7B, and 8D in accordance with an illustrative embodiment.

Referring to FIG. 17, a training loss curve 1700 and a validation loss curve 1702 computed using the EE 4 method are shown. Referring to FIG. 18, a training error 1800 and a validation error 1802 computed using the EE 4 method are shown.

Figure 19:
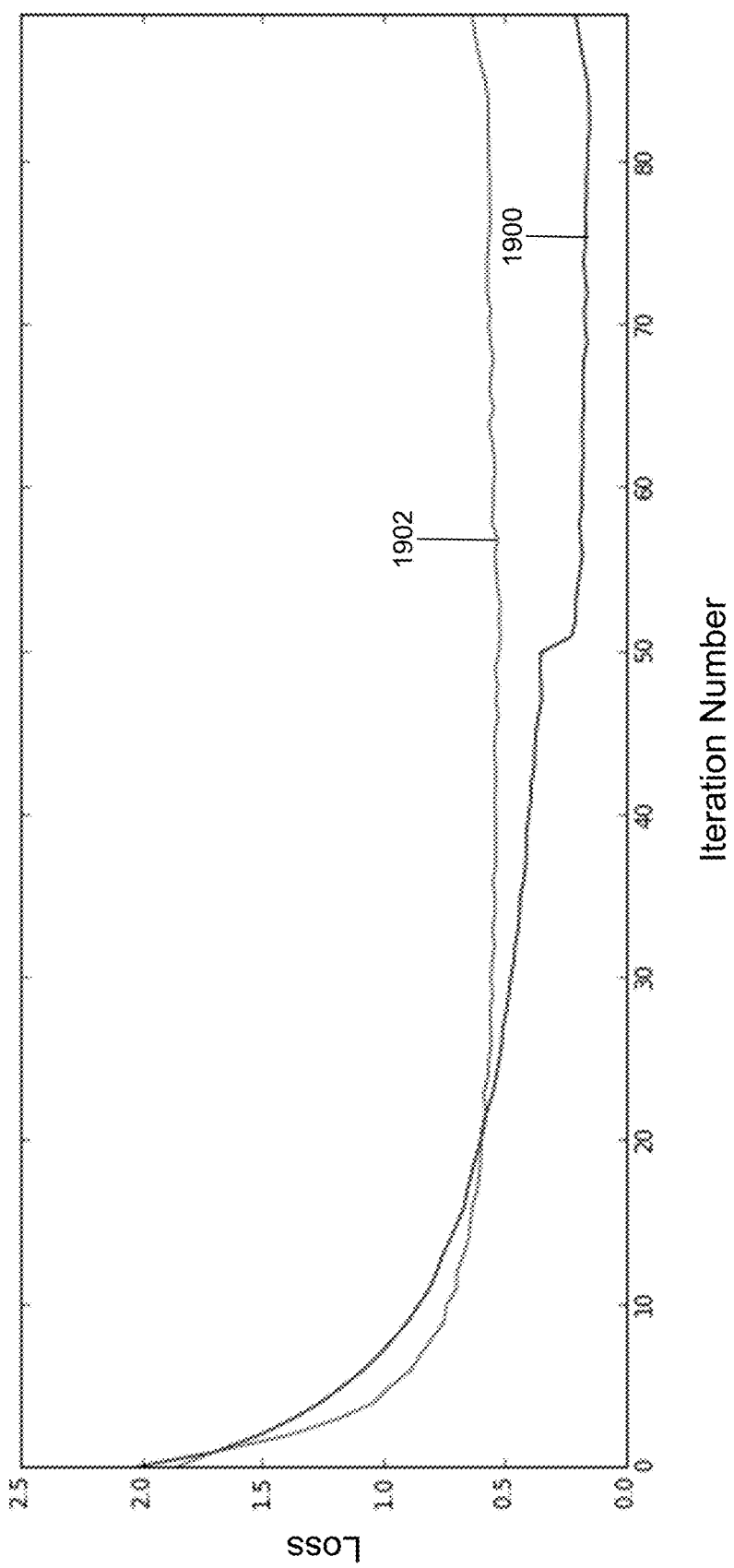
FIG. 19 shows a training loss and a validation loss computed by the neural network training system of FIG. 1 using the operations of FIGS. 6, 7A, 7B, and 8E in accordance with an illustrative embodiment.
Figure 20:
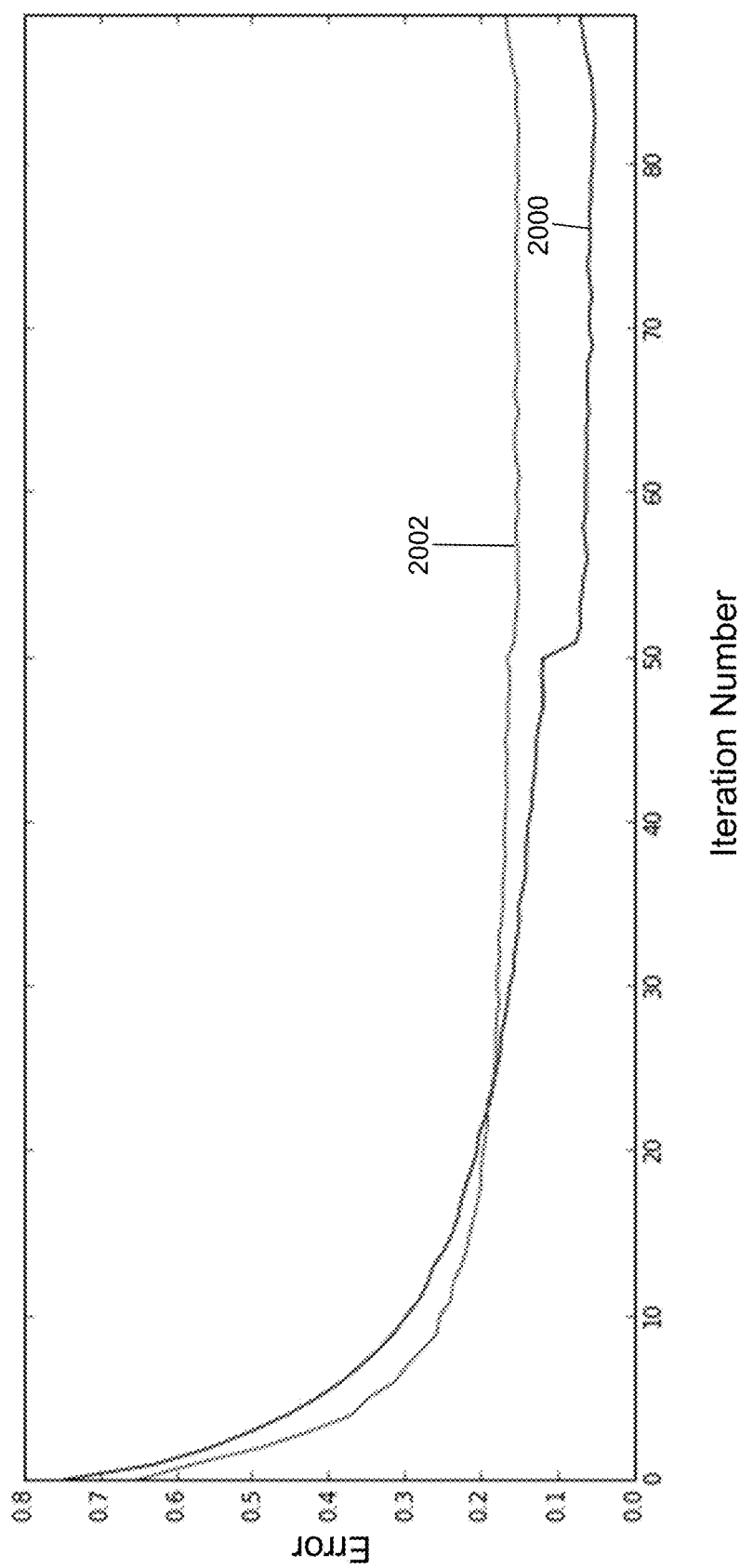
FIG. 20 shows a training error and a validation error computed by the neural network training system of FIG. 1 using the operations of FIGS. 6, 7A, 7B, and 8E in accordance with an illustrative embodiment.

Referring to FIG. 19, a training loss curve 1900 and a validation loss curve 1902 computed using the EE 5 method are shown. Referring to FIG. 20, a training error 2000 and a validation error 2002 computed using the EE 5 method are shown.

There are applications for model training application 222, manager application 312, model train/score application 412, and/or prediction application 922 in many areas such as process control and equipment health monitoring, image processing and classification, data segmentation, data analysis, etc. Model training application 222, manager application 312, and model train/score application 412 provide efficient distributed and parallel computing device implementations for training neural network models. The presented results demonstrate improved or comparable model accuracies with faster computing times.

The explosion of digital data is generating many opportunities for big data analytics, which in turn provides many opportunities for training neural network predictive models to capitalize on the information contained in the data—to make better predictions that lead to better decisions.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a first computing device cause the first computing device to:
   distribute explore phase optimization parameter values to each computing device of a plurality of computing devices;
   distribute a subset of a training dataset to each computing device of the plurality of computing devices;
   distribute a validation dataset to each computing device of the plurality of computing devices;
   request initialization of a neural network model by the plurality of computing devices;
   (a) request execution of the initialized neural network model by the plurality of computing devices using the subset of the training dataset stored at each computing device of the plurality of computing devices;
   (b) receive a first result of the execution from a computing device of the plurality of computing devices, wherein the first result is an accuracy value computed using the distributed validation dataset;
   (c) identify a computing device of the plurality of computing devices that has an extremum value for the accuracy value in comparison to other computing devices of the plurality of computing devices;
   (d) request next configuration data for the neural network model from the identified computing device;
   (e) receive the requested next configuration data from the identified computing device;
   (f) distribute the received next configuration data to the plurality of computing devices except the identified computing device;
   repeat (a) to (f) until an exploration phase is complete based on the explore phase optimization parameter values, wherein in (a), the neural network model is reinitialized with the distributed next configuration data at each computing device of the plurality of computing devices;
   distribute exploit phase optimization parameter values to each computing device of the plurality of computing devices;
   (g) request execution of the neural network model by the plurality of computing devices using the subset of the training dataset stored at each computing device of the plurality of computing devices;
   (h) receive a second result of the execution from the computing device of the plurality of computing devices;
   (i) compute next configuration data for the neural network model based on the received second result;
   (j) distribute the computed next configuration data to the computing device;
   repeat (g) to (j) until an exploitation phase is complete based on the exploit phase optimization parameter values; and
   output at least a portion of the computed next configuration data to define a trained neural network model.

2. The non-transitory computer-readable medium of claim 1, wherein each distributed subset is different.

3. The non-transitory computer-readable medium of claim 1, wherein the validation dataset distributed to each computing device is identical.

4. The non-transitory computer-readable medium of claim 1, wherein initialization of the neural network model at each computing device is identical.

5. The non-transitory computer-readable medium of claim 1, wherein the first computing device is not included in the plurality of computing devices.

6. The non-transitory computer-readable medium of claim 1, wherein the explore phase optimization parameter values include at least one value that is not equal to a corresponding value of the exploit phase optimization parameter values.

7. The non-transitory computer-readable medium of claim 1, wherein (a) to (f) are repeated asynchronously for each computing device of the plurality of computing devices.

8. The non-transitory computer-readable medium of claim 7, wherein (g) to (j) are repeated synchronously for the plurality of computing devices.

9. The non-transitory computer-readable medium of claim 1, wherein (a) to (f) are repeated synchronously for the plurality of computing devices.

10. The non-transitory computer-readable medium of claim 9, wherein (g) to (j) are repeated asynchronously for each computing device of the plurality of computing devices.

11. The non-transitory computer-readable medium of claim 1, wherein the received second result is a gradient vector computed using the distributed validation dataset.

12. The non-transitory computer-readable medium of claim 11, wherein computing the next configuration data for the neural network model based on the received second result comprises:
   solving an optimization problem defined by the exploit phase optimization parameter values using the gradient vector from each computing device of the plurality of computing devices;
   performing a collective reduce operation to aggregate the gradient vector from each computing device of the plurality of computing devices; and
   computing new neural network weight values from the aggregated gradient vector, wherein the next configuration data includes the new neural network weight values.

13. The non-transitory computer-readable medium of claim 1, wherein distributing the selected next configuration data in (f) comprises sending, by the first computing device, the configuration data for the neural network model computed by the identified computing device to remaining devices of the plurality of computing devices.

14. The non-transitory computer-readable medium of claim 1, wherein distributing the selected next configuration data in (f) comprises requesting that the identified computing device send configuration data for the neural network model computed by the identified computing device to remaining devices of the plurality of computing devices.

15. The non-transitory computer-readable medium of claim 1, wherein identifying the computing device in (c) comprises:
- determining if the accuracy value is better than a current accuracy value; and
- when the accuracy value is better than a current accuracy value, the next configuration data for the neural network model is requested from the computing device and stored as the next configuration data and the current accuracy value is set equal to the accuracy value.

16. The non-transitory computer-readable medium of claim 15, wherein distributing the selected next configuration data in (f) comprises sending the stored next configuration data to the computing device when the accuracy value is not better than the current accuracy value.

17. The non-transitory computer-readable medium of claim 15, wherein the accuracy value is better than the current accuracy value when the accuracy value is greater than the current accuracy value.

18. The non-transitory computer-readable medium of claim 15, wherein after the exploration phase is complete and before (g), the computer-readable instructions further cause the first computing device to send the stored next configuration data to each computing device of the plurality of computing devices to reinitialize the neural network model at each computing device of the plurality of computing devices.

19. The non-transitory computer-readable medium of claim 1, wherein execution of the initialized neural network model by the plurality of computing devices in (a) comprises second computer-readable instructions that when executed by each computing device of the plurality of computing devices cause each computing device of the plurality of computing devices to:
- (aa) select a set of observation vectors from the subset of the training dataset stored at each computing device;
- (ab) execute the neural network model using the distributed explore phase optimization parameter values with the selected set of observation vectors;
- (ac) update local configuration data based on results from the executed neural network model;
- (ad) repeat (aa) to (ac) until all observation vectors included in the subset of the training dataset stored at each computing device have been selected without replacement;
- (ae) repeat (aa) to (ad) until training is complete based on the distributed explore phase optimization parameter values;
- execute the neural network model using the distributed explore phase optimization parameter values and the updated local configuration data with the distributed validation dataset to compute the first result; and
- send the computed first result to the first computing device.

20. The non-transitory computer-readable medium of claim 1, wherein the explore phase optimization parameter values include an explore mini-batch size value used to execute the initialized neural network model by the plurality of computing devices in (a), wherein the exploit phase optimization parameter values include an exploit mini-batch size value used to execute the neural network model by the plurality of computing devices in (g), wherein the explore mini-batch size value is less than the exploit mini-batch size value.

21. The non-transitory computer-readable medium of claim 1, wherein computing the next configuration data in (i) comprises computing new neural network weight values from the received second result.

22. A computing device comprising:
- a processor; and
- a computer-readable medium operably coupled to the processor, the computer-readable medium having computer-readable instructions stored thereon that, when executed by the processor, cause the computing device to
- distribute explore phase optimization parameter values to each computing device of a plurality of computing devices;
- distribute a subset of a training dataset to each computing device of the plurality of computing devices;
- distribute a validation dataset to each computing device of the plurality of computing devices;
- request initialization of a neural network model by the plurality of computing devices;
- (a) request execution of the initialized neural network model by the plurality of computing devices using the subset of the training dataset stored at each computing device of the plurality of computing devices;
- (b) receive a first result of the execution from a computing device of the plurality of computing devices, wherein the first result is an accuracy value computed using the distributed validation dataset;
- (c) identify a computing device of the plurality of computing devices that has an extremum value for the accuracy value in comparison to other computing devices of the plurality of computing devices;
- (d) request next configuration data for the neural network model from the identified computing device; and
- (e) receive the requested next configuration data from the identified computing device;
- (f) distribute the received next configuration data to the plurality of computing devices except the identified computing device;
- repeat (a) to (f) until an exploration phase is complete based on the explore phase optimization parameter values, wherein in (a), the neural network model is reinitialized with the distributed next configuration data at each computing device of the plurality of computing devices;
- distribute exploit phase optimization parameter values to each computing device of the plurality of computing devices;
- (g) request execution of the neural network model by the plurality of computing devices using the subset of the training dataset stored at each computing device of the plurality of computing devices;
- (h) receive a second result of the execution from the computing device of the plurality of computing devices;
- (i) compute next configuration data for the neural network model based on the received second result;
- (j) distribute the computed next configuration data to the computing device;
- repeat (g) to (j) until an exploitation phase is complete based on the exploit phase optimization parameter values; and
- output at least a portion of the computed next configuration data to define a trained neural network model.

23. A method of providing distributed training of a neural network model, the method comprising:

distributing, by a first computing device, explore phase optimization parameter values to each computing device of a plurality of computing devices;

distributing, by the first computing device, a subset of a training dataset to each computing device of the plurality of computing devices;

distributing, by the first computing device, a validation dataset to each computing device of the plurality of computing devices;

requesting, by the first computing device, initialization of a neural network model by the plurality of computing devices;

(a) requesting, by the first computing device, execution of the initialized neural network model by the plurality of computing devices using the subset of the training dataset stored at each computing device of the plurality of computing devices;

(b) receiving, by the first computing device, a first result of the execution from a computing device of the plurality of computing devices, wherein the first result is an accuracy value computed using the distributed validation dataset;

(c) identifying, by the first computing device, a computing device of the plurality of computing devices that has an extremum value for the accuracy value in comparison to other computing devices of the plurality of computing devices;

(d) requesting, by the first computing device, next configuration data for the neural network model from the identified computing device; and (e) receiving, by the first computing device, the requested next configuration data from the identified computing device;

(f) distributing, by the first computing device, the received next configuration data to the plurality of computing devices except the identified computing device;

repeating, by the first computing device, (a) to (f) until an exploration phase is complete based on the explore phase optimization parameter values, wherein in (a), the neural network model is reinitialized with the distributed next configuration data at each computing device of the plurality of computing devices;

distributing, by the first computing device, exploit phase optimization parameter values to each computing device of the plurality of computing devices;

(g) requesting, by the first computing device, execution of the neural network model by the plurality of computing devices using the subset of the training dataset stored at each computing device of the plurality of computing devices;

(h) receiving, by the first computing device, a second result of the execution from the computing device of the plurality of computing devices;

(i) computing, by the first computing device, next configuration data for the neural network model based on the received second result;

(j) distributing, by the first computing device, the computed next configuration data to the computing device;

repeating, by the first computing device, (g) to (j) until an exploitation phase is complete based on the exploit phase optimization parameter values; and outputting, by the first computing device, at least a portion of the computed next configuration data to define a trained neural network model.

24. The method of claim 23, wherein each distributed subset is different.

25. The method of claim 23, wherein the validation dataset distributed to each computing device is identical.

26. The method of claim 23, wherein initialization of the neural network model at each computing device is identical.

27. The method of claim 23, wherein the explore phase optimization parameter values include at least one value that is not equal to a corresponding value of the exploit phase optimization parameter values.

28. The method of claim 23, wherein (a) to (f) are repeated asynchronously for each computing device of the plurality of computing devices.

29. The method of claim 28, wherein (g) to (j) are repeated synchronously for the plurality of computing devices.

30. The method of claim 23, wherein the explore phase optimization parameter values include an explore mini-batch size value used to execute the initialized neural network model by the plurality of computing devices in (a), wherein the exploit phase optimization parameter values include an exploit mini-batch size value used to execute the neural network model by the plurality of computing devices in (g), wherein the explore mini-batch size value is not equal to less than the exploit mini-batch size value.

* * * * *